United States Patent
Salowitz et al.

(10) Patent No.: US 11,726,644 B2
(45) Date of Patent: Aug. 15, 2023

(54) PROVIDING VISUAL FEEDBACK DURING TOUCH-BASED OPERATIONS ON USER INTERFACE ELEMENTS

(71) Applicant: MICROSOFT TECHNOLOGY LICENSING, LLC, Redmond, WA (US)

(72) Inventors: Elizabeth Salowitz, Kirkland, WA (US); Sha Viswanathan, Redmond, WA (US); Joseph Spencer King, Seattle, WA (US); Albert Peter Yih, Redmond, WA (US); Hadley Meryl Griffin, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 80 days.

(21) Appl. No.: 17/353,659

(22) Filed: Jun. 21, 2021

(65) Prior Publication Data
US 2022/0404958 A1 Dec. 22, 2022

(51) Int. Cl.
*G06F 3/04845* (2022.01)
*G06F 3/04812* (2022.01)
*G06F 3/0488* (2022.01)

(52) U.S. Cl.
CPC ........ *G06F 3/04845* (2013.01); *G06F 3/0488* (2013.01); *G06F 3/04812* (2013.01);
(Continued)

(58) Field of Classification Search
CPC ............. G06F 3/04845; G06F 3/04812; G06F 3/0488; G06F 2203/01804; G06F 2203/04808
See application file for complete search history.

(56) References Cited

U.S. PATENT DOCUMENTS

| 10,379,706 B2* | 8/2019 | Kim ................... G06F 3/04883 |
| 2011/0072344 A1* | 3/2011 | Harris ..................... G06F 9/543 |
| | | 715/776 |

(Continued)

OTHER PUBLICATIONS

"Invitation To Pay Additional Fees Issued in PCT Application No. PCT/US22/029085", dated Sep. 9, 2022, 11 Pages.

(Continued)

*Primary Examiner* — Ting Z Lee
(74) *Attorney, Agent, or Firm* — Newport IP, LLC; Leonard J. Hope

(57) ABSTRACT

Technologies are disclosed for providing visual feedback during touch-based operations on user interface ("UI") elements. Through implementations of the disclosed technologies, visual feedback can be provided to users during certain touch-based operations on UI elements presented by touch-enabled computing devices. The visual feedback can provide confirmation to users that certain touch-based operations on UI elements were performed successfully. The visual feedback provided by the disclosed technologies can make it easier for users to select a UI element, to understand that actions taken to select a UI element were successful, and to successfully perform operations on UI elements once they have been selected. These benefits can reduce the number of times users need to attempt certain touch-based operations on UI elements. This, in turn, can reduce the utilization of computing resources, such as memory and processor cycles, by touch-enabled computing devices implementing the disclosed technologies.

17 Claims, 27 Drawing Sheets

(52) U.S. Cl.
CPC .............. *G06F 2203/04804* (2013.01); *G06F 2203/04808* (2013.01)

(56) References Cited

U.S. PATENT DOCUMENTS

| | | |
|---|---|---|
| 2014/0245148 A1 | 8/2014 | Silva et al. |
| 2014/0285823 A1* | 9/2014 | Oda ........................ G03G 15/50 358/1.2 |
| 2015/0007078 A1 | 1/2015 | Feng et al. |
| 2015/0012879 A1* | 1/2015 | Kim ....................... G06F 3/0481 715/788 |
| 2015/0121243 A1* | 4/2015 | Schmieder ............ G06T 11/001 715/740 |
| 2016/0026358 A1* | 1/2016 | Stewart ............... G06F 3/04883 715/781 |
| 2016/0085438 A1 | 3/2016 | Doan et al. |
| 2019/0339855 A1 | 11/2019 | Walkin et al. |
| 2021/0096715 A1* | 4/2021 | Lee ........................ G06F 1/1618 |

OTHER PUBLICATIONS

"International Search Report and Written Opinion Issued in PCT Application No. PCT/US22/029085", dated Nov. 4, 2022, 19 Pages.

\* cited by examiner

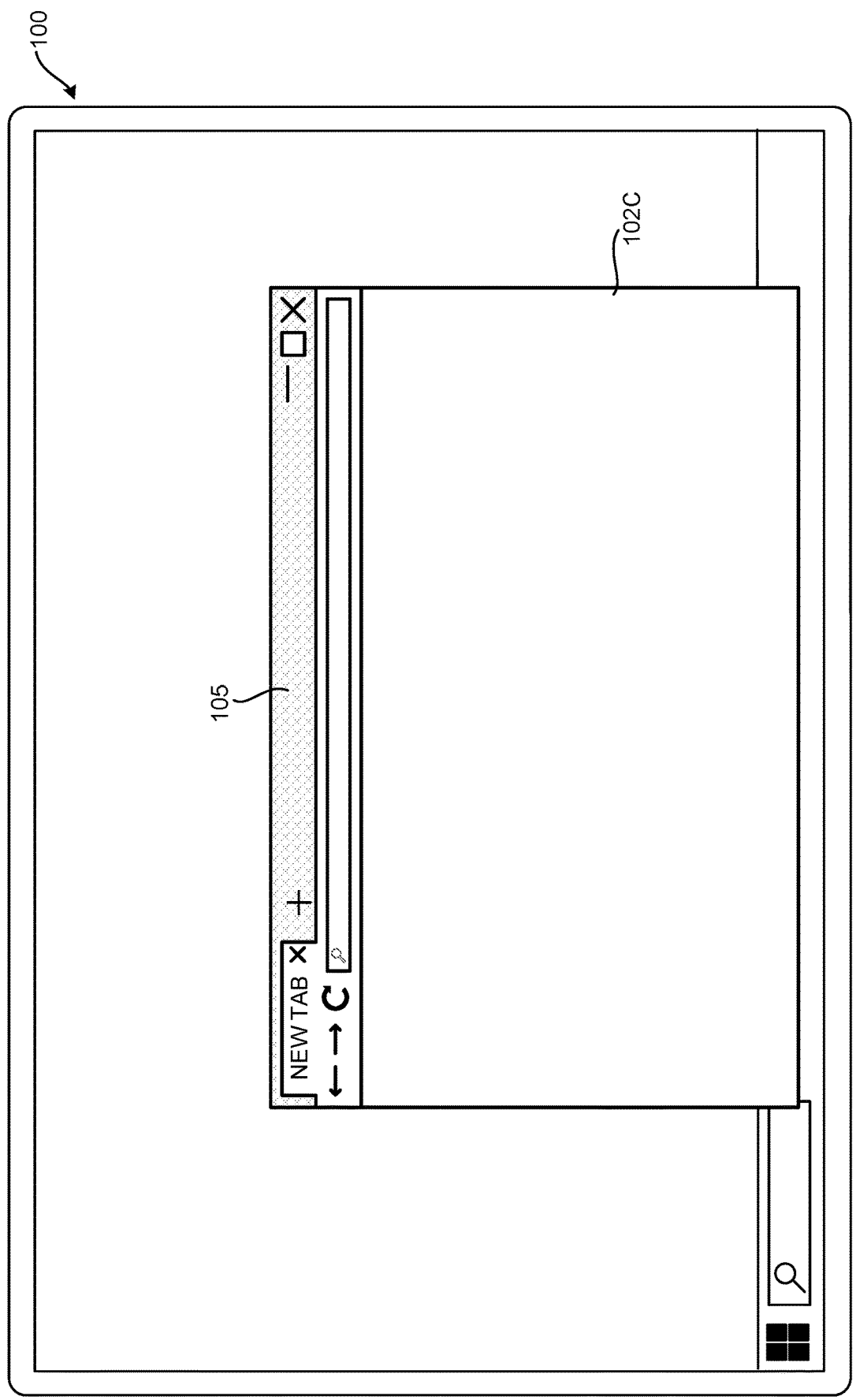

PROVIDING VISUAL FEEDBACK DURING TOUCH-BASED OPERATIONS ON USER INTERFACE ELEMENTS

BACKGROUND

The display screens of touch-enabled computing devices are touch sensitive, thereby enabling such devices to recognize touch or stylus input, taps, swipes, and other types of user input gestures. Examples of touch-enabled computing devices include, but are not limited to, tablet and slate computing devices, smartphones, and convertible computing devices (also known as "2-in-1 devices") that include both a physical keyboard and a touch-enabled display.

Touch-enabled computing devices can provide significant additional functionality as compared to computing devices that are not touch-enabled. Touch-enabled computing devices, however, can also present certain usability challenges, particularly when used with operating systems that utilize user interface ("UI") windows and other similar UI elements.

As a particular example, due to the limited amount of space available in a UI window it might be difficult for a user of a touch-enabled computing device to utilize a finger to select a specific portion of the UI window in order to initiate an operation on the UI window, such as a move or resize operation. Moreover, even when a user has successfully selected a specific portion of a UI window or other element in order to initiate an operation, it might be difficult for the user to understand that their selection operation was actually successful. As a result, the user might repeatedly attempt to select the UI window. This can be very frustrating to users and unnecessarily utilize computing resources of touch-enabled computing devices.

It is with respect to these and other technical challenges that the disclosure made herein is presented.

SUMMARY

Technologies are disclosed herein for providing visual feedback during touch-based operations on UI elements. Through implementations of the disclosed technologies, visual feedback can be provided to users during certain touch-based operations on UI elements presented by touch-enabled computing devices. The visual feedback can provide confirmation to users that certain operations on UI elements were performed successfully. For example, and without limitation, visual feedback can be provided by a touch-enabled computing device when a user has successfully selected a portion of a UI window that is utilized to move the UI window.

The visual feedback provided by the disclosed technologies can make it easier for users to select a UI element, to understand that actions taken to select a UI element were successful, and to successfully perform operations on UI elements once they have been selected. These benefits can reduce the number of times users need to attempt certain touch-based operations on UI elements. This, in turn, can reduce the utilization of computing resources, such as memory and processor cycles, by touch-enabled computing devices implementing the disclosed technologies. Other technical benefits not specifically mentioned herein can also be realized through implementations of the disclosed subject matter.

The embodiments disclosed herein can be implemented in conjunction with touch-enabled computing devices such as, but not limited to, tablet and slate computing devices, smartphones, touch-enabled desktop computers, and convertible computing devices that include both a physical keyboard and a touch-enabled display. The display screens in touch-enabled computing devices are touch sensitive and can be configured to detect discrete touches, single touch gestures, and/or multi-touch gestures. These are collectively referred to herein as "gestures" for convenience. Various types of gestures and the functionality they provide will be described below.

In order to realize the technical benefits mentioned briefly above, and potentially others, a touch-enabled computing device is configured to display UI elements. UI elements are on-screen components that are displayed in order to present a user interface. UI elements can include, but are not limited to, UI windows displayed by applications (e.g., "application windows") and UI windows displayed by an operating system (e.g., "operating system windows"). Although the examples presented herein are primarily discussed in the context of UI windows, it is to be appreciated that the disclosed technologies can be utilized with other types of UI elements in other configurations.

In one embodiment, the disclosed technologies provide visual feedback during a touch-based operation in order to clearly indicate to a user the UI element, or UI elements, that are to be operated upon by a subsequent gesture. For example, and without limitation, a touch-enabled computing device might display a UI element, such as a UI window, on its touch-sensitive display. A first user input gesture might be received by way of the touch-sensitive display such as, for example, a three-finger tap and hold gesture. In response thereto, the size of the UI element, or UI elements, is reduced from an original size to a reduced size in one embodiment. Reducing the size of a UI element, or elements, in this manner indicates to a user that the UI element, or UI elements, is available to be operated on by a subsequent gesture. Other visual attributes of UI elements might be modified in other embodiments to provide such an indication.

Subsequently, a second user input gesture may be received by way of the touch-sensitive display. In response thereto, an operation may be performed on the UI element, or elements. For example, the second user input gesture might be a three-finger drag gesture that causes the most recently used UI element to be brought to the foreground. Following the performance of the operation triggered by the second user input gesture, the UI element, or UI elements, can be returned to its original size.

In another embodiment, an additional visual indication can be provided during an operation for selecting and moving a UI element. In particular, a one-finger tap and hold gesture might be received in an area of a UI element designated for performing a move operation on the UI element. For instance, a one-finger tap and hold gesture might be targeted to a portion of a UI window reserved for moving the UI window (e.g., the title bar). In response thereto, the UI element might be reduced in size in the manner described above. Additionally, a visual indicator might be presented that surrounds the UI element. The size of the visual indicator is the same as the UI element before it was reduced in size in some embodiments.

In the case of a UI window, the visual indicator might be a colored rectangle that surrounds the UI window and extends beyond the edges of the UI window on all four sides. In some embodiments, the visual indicator is translucent such that UI objects beneath the visual indicator can still be seen. Other types of visual indicators can be provided for other types of UI elements in other embodiments.

Following the one-finger tap and hold gesture, a user might perform a one finger drag gesture in order to move the selected UI element to a new location. The visual indicator moves with the UI element as it is repositioned. In embodiments where the visual indicator is the same size as the UI element before it was reduced in size, the visual indicator also provides an indication to the user of the size that the UI element will be when the move operation is completed. When the user has completed the move operation, the UI element is returned to its original size and the visual indicator is removed.

In another embodiment, the disclosed technologies provide visual feedback during a touch-based operation in order to clearly indicate to a user the portion of a UI element that is to be resized. In this embodiment, a UI element is displayed on the touch-sensitive display of a touch-enabled computing device and a first user input gesture is received. In one embodiment, the gesture is a tap and hold gesture located at an edge of the UI element. For instance, in the case of a UI window having a left edge, a right edge, a bottom edge, and a top edge, the first user input gesture may be made at any of the edges of the UI window.

In response to receiving the first user input gesture, a visual indicator is displayed along the selected edge of the UI element. In the case of a UI window, for instance, the visual indicator might be a colored rectangle that extends the entire length of the selected side of the UI element. In some embodiments, the visual indicator is translucent such that UI objects beneath the visual indicator can still be seen. Other types of visual indicators can be provided for other types of UI elements in other embodiments.

Subsequently, a second user input gesture may be received to resize the UI element such as, for example, a one finger drag gesture. In response to receiving such a gesture, the UI element is resized in the direction of the gesture. Additionally, the visual indicator is displayed along the selected edge of the UI element during the resizing of the UI element. In some embodiments, the size of the visual indicator is reduced during the resizing operation. Once the resizing operation performed in response to the second user input gesture is complete, the visual indicator is removed.

In another embodiment, a user input gesture is received at a corner of a UI element. For example, in the case of a rectangular UI window, a tap and hold gesture might be received at any of the four corners of the UI window. In response thereto, visual indicators may be displayed along the edges of the UI element that intersect the selected corner of the UI element in the manner described above. The visual indicators in this example indicate to the user the two sides of the UI element that will be resized by a subsequent drag gesture.

Subsequently, a second user input gesture may be received to resize the UI element such as, for example, a one finger drag gesture. In response to receiving such a gesture, the UI element is resized in the direction of the gesture. Additionally, the visual indicators are displayed along the edges of the UI element during the resizing of the UI element. In some embodiments, the size of the visual indicators is reduced during the resizing operation. Once the resizing operation performed in response to the second user input gesture is complete, the visual indicators are removed.

As discussed briefly above, implementations of the technologies disclosed herein provide various technical benefits such as, but not limited to, reducing the number of times users attempt certain actions on UI elements (e.g., actions for selecting UI elements) which, in turn, can reduce the utilization of computing resources, such as memory and processor cycles, by touch-enabled computing devices implementing aspects of the disclosed subject matter. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3E is a UI diagram illustrating additional aspects of the mechanism shown in FIGS. 3A-3D for providing visual feedback during touch-based movement of a UI element, according to one embodiment disclosed herein;

DETAILED DESCRIPTION

Figure 1A:
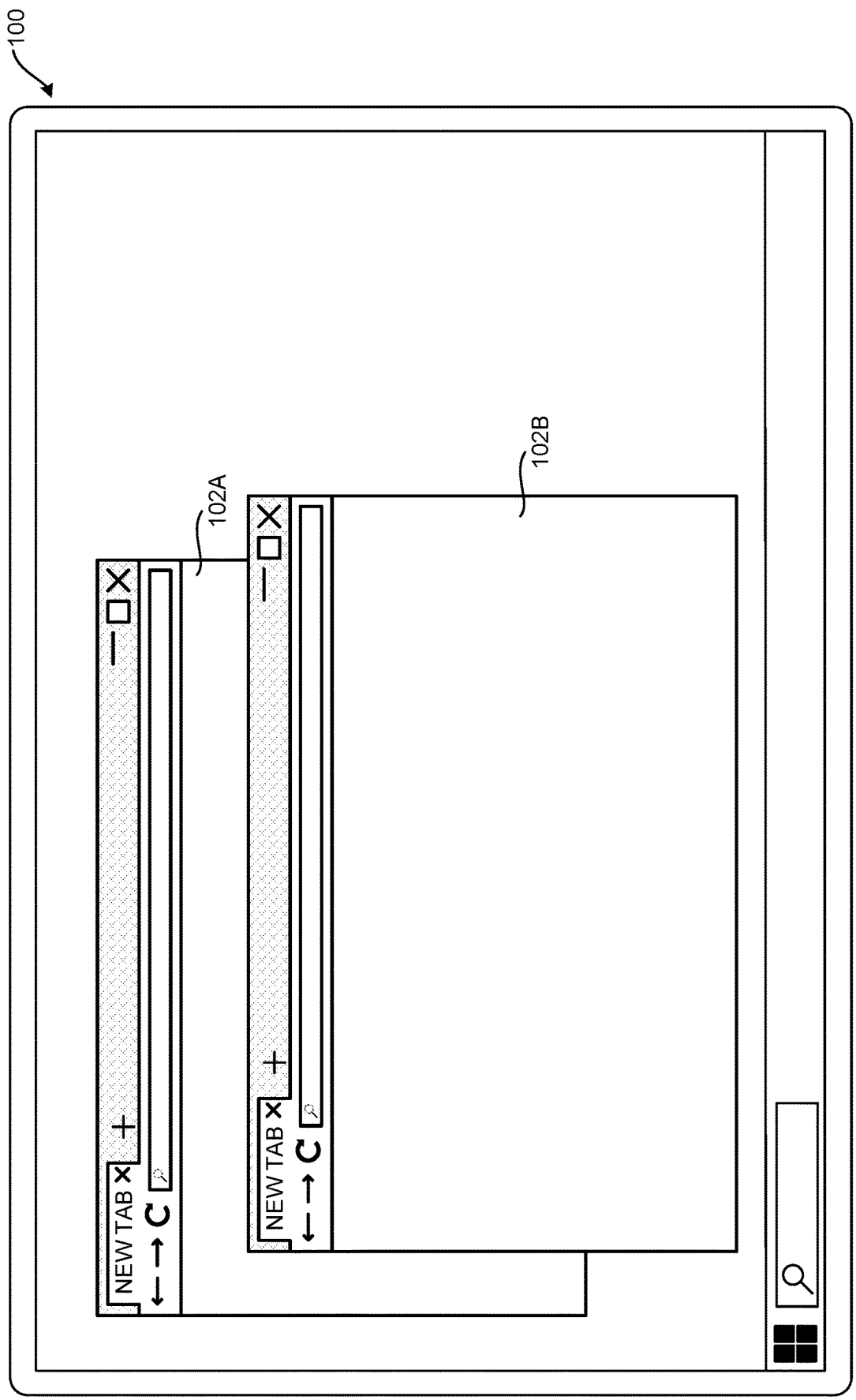
FIG. 1A is a UI diagram illustrating aspects of one mechanism disclosed herein for providing visual feedback during touch-based operations on UI elements, according to one embodiment disclosed herein.

The following detailed description is directed to technologies for providing visual feedback during touch-based operations on UI elements. As discussed briefly above, various technical benefits can be realized through implementations of the disclosed technologies such as, but not limited to, reducing the number of times users attempt certain touch-based operations on UI elements which, in turn, can reduce the utilization of computing resources, such as memory and processor cycles, by touch-enabled computing devices implementing aspects of the disclosed subject matter. Other technical benefits not specifically mentioned herein can also be realized through implementations of the disclosed subject matter.

While the subject matter described herein is presented in the general context of a touch-enabled desktop, laptop, smartphone, or tablet computing device configured for providing visual feedback during touch-based operations on UI elements, those skilled in the art will recognize that other implementations can be performed in combination with other types of touch-enabled computing devices, systems, and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation, etc.), mini-computers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing visual feedback during touch-based operations on UI elements will be described.

FIG. 1A is a UI diagram illustrating aspects of one mechanism disclosed herein for providing visual feedback during touch-based operations on UI elements, according to one embodiment. In particular, FIG. 1A shows a touch-enabled computing device 100 (which might be referred to as "the device 100"), in this case a tablet computing device. As discussed above, the display screens of touch-enabled computing devices, such as the device 100, are touch sensitive, thereby enabling such devices to recognize touch or stylus input, taps, swipes, and other types of gestures, some of which are described below.

Touch-sensitive displays screens can be resistive touch-screens, capacitive touchscreens, surface acoustic wave touchscreens, infrared touchscreens, optical imaging touch-screens, dispersive signal touchscreens, acoustic pulse recognition touchscreens, or can utilize any other touchscreen technology. In some configurations, the touchscreen is incorporated on top of a display as a transparent layer to enable a user to use one or more touches to interact with objects or other information presented on the display.

As mentioned above, a touch-sensitive display screen can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the device 100 supports a tap gesture in which a user taps a display once. A double tap gesture in which a user taps a display twice can also be supported. The double tap gesture can be used to perform various operations including, but not limited to, zooming in or zooming out in stages. Tap gestures can also be performed utilizing multiple fingers.

In some configurations, the device 100 supports a tap and hold gesture in which a user taps and maintains contact with the display for at least a pre-defined period of time. The tap and hold gesture can be used for various reasons including, but not limited to, making a selection of a portion of a UI element. Tap and hold gestures can also be performed using multiple fingers.

In some configurations, the device 100 supports a drag gesture in which a user places a finger on a display and maintains contact with display while moving their finger. The drag gesture can be used for various reasons including, but not limited to, moving through screens, images, or menus at a controlled rate. Multiple finger drag gestures are also contemplated.

In some configurations, the device 100 supports a flick gesture in which a user swipes a finger in the direction the user wants the screen to move. The flick gesture can be used for various reasons including, but not limited to, scrolling horizontally or vertically through menus or pages.

In some configurations, the device 100 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other objects such as digital pens can be used to interact with touch-sensitive display of the device 100. As such, the above gestures should be understood as being illustrative and should not be construed as being limiting in any way. Additional gestures may be described herein.

Additionally, and as will be described in greater detail below with regard to FIG. 9, the technologies disclosed herein can also be utilized with augmented reality ("AR") or virtual reality ("VR") devices utilizing a "virtual touch." Accordingly, the term "touch" as utilized herein encompasses both a physical touch of a touch-enabled device and a virtual touch of a UI element presented by an AR or VR device.

As also discussed briefly above, the device 100 is configured to display UI elements. UI elements are on-screen components that are displayed in order to present a user interface. UI elements can include, but are not limited to, UI windows displayed by applications (e.g., "application windows") and UI windows displayed by an operating system (e.g., "operating system windows"). Although the examples presented herein are primarily discussed in the context of UI windows, it is to be appreciated that the disclosed technologies can be utilized with other types of UI elements in other configurations.

As mentioned briefly above, in the embodiment illustrated in FIGS. 1A-1D, visual feedback is provided during certain touch-based operations in order to clearly indicate to a user the UI element, or UI elements, that are to be operated upon by a subsequent user input gesture. For example, and without limitation, a touch-enabled computing device, such as the device 100, may display a UI element, such as a UI window, on its touch-sensitive display.

In the example shown in FIG. 1A, for instance, the device 100 is displaying two UI windows 102A and 102B, in this case application windows displayed by a web browser application. It is to be appreciated, however, that this example display is merely illustrative and that the embodiments disclosed herein can be utilized with more or fewer UI elements and UI elements displayed by an operating system or other types of applications.

Figure 1B:
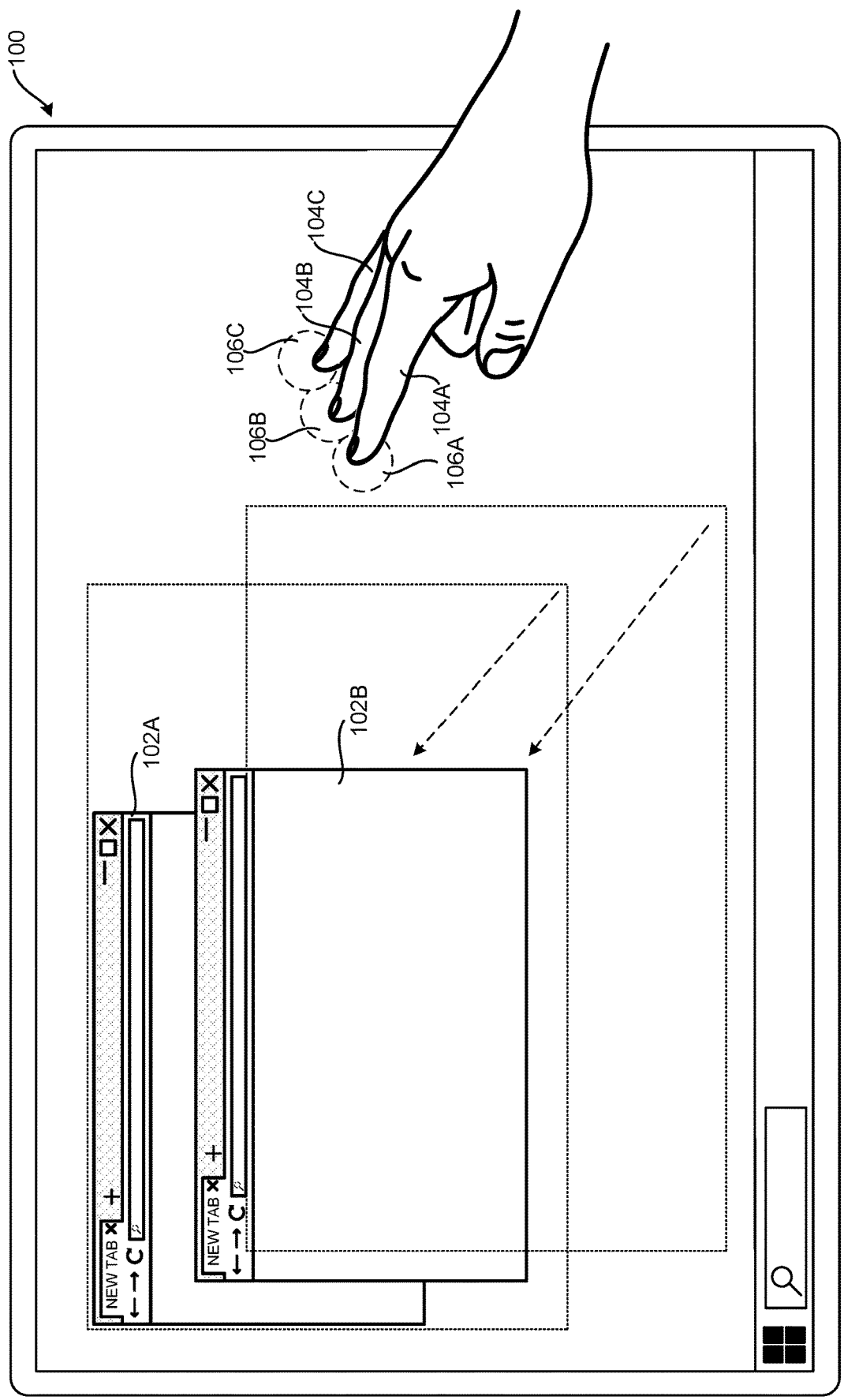
FIG. 1B is a UI diagram illustrating additional aspects of the mechanism shown in FIG. 1A for providing visual feedback during touch-based operations on UI elements, according to one embodiment disclosed herein.

As shown in FIG. 1B, a first user input gesture may be received by way of the touch-sensitive display such as, for example, a three-finger tap and hold gesture. As shown in FIG. 1B, the three-finger tap and hold gesture involves placing three fingers 104A-104C on the screen of the device 100 at three different locations 106A-106C, respectively, and holding the fingers in place for a predetermined period of time.

In response to the first user input gesture (i.e., the three-finger tap and hold gesture in the illustrated embodiment), the size of the on-screen UI element, or UI elements, is reduced from an original size to a reduced size in one embodiment. For instance, in the example shown in FIG. 1B, the size of the UI windows 102A and 102B has been reduced. The dotted lines in FIG. 1B illustrate the original sizes of the UI windows 102A and 102B (as shown in FIG. 1A).

In one particular embodiment, a screenshot of a UI window 102 is taken and reduced in size by an appropriate amount. The reduced size window is then displayed in place of the full size window. In this manner, the application responsible for presenting the UI window does not have to be modified in order to provide the functionality presented herein. In other embodiments, the application itself may be responsible for scaling the size of the UI window 102. Other mechanisms can be utilized in other embodiments.

Reducing the size of a UI element, or elements, in the manner shown in FIG. 1B can indicate to a user that the UI element, or UI elements, is to be operated on by a subsequent user input gesture. For example, in the illustrated embodiment, reducing the size of the UI windows 102A and 102B can indicate to the user that an operation initiated by a subsequent gesture will be performed on the UI windows 102A and 102B. Other visual attributes of UI elements such as the UI windows 102A and 102B might be modified in other embodiments to provide such an indication. Moreover, it is to be appreciated that the size and location of the UI elements can be reduced in different ways in various embodiments. For example, and without limitation, the original and reduced size UI elements do not have to share (or substantially share) a common point as illustrated in FIG. 1B or may share other common points.

Figure 1C:
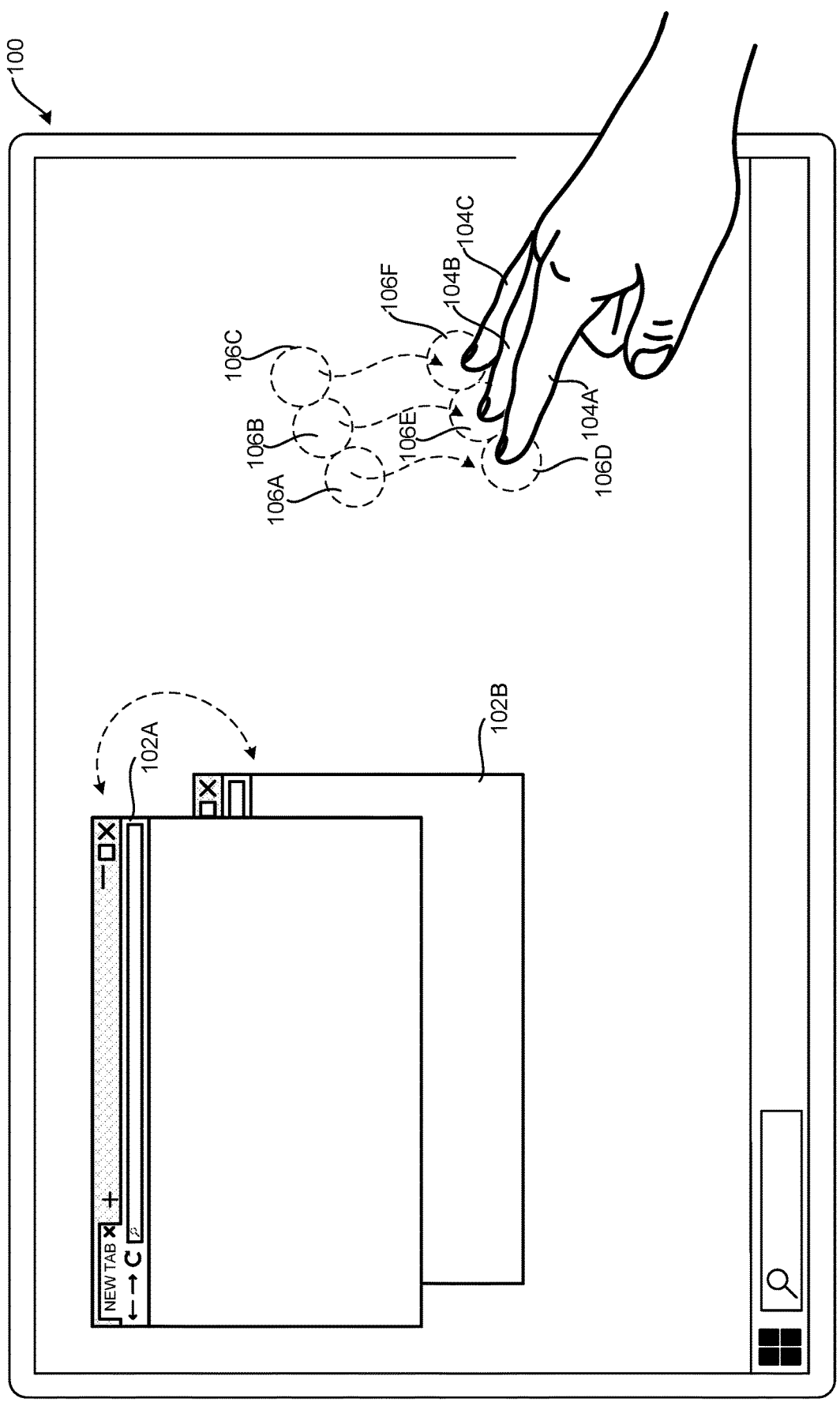
FIG. 1C is a UI diagram illustrating additional aspects of the mechanism shown in FIGS. 1A and 1B for providing visual feedback during touch-based operations on UI elements, according to one embodiment disclosed herein.

As shown in FIG. 1C, a second user input gesture may be subsequently received by way of the touch-sensitive display of the device 100. In the illustrated example, the user has performed a three-finger drag gesture by moving their fingers 104A-104C from the locations 106A-106C on the display to the locations 106D-106F, respectively.

In response to receiving the second user input gesture, an operation may be performed on the displayed UI element, or UI elements, in this case the UI windows 102A and 102B. For example, where the second user input gesture is a three-finger drag gesture as illustrated in FIG. 1C, the operation causes the most recently used UI element to be brought to the foreground. In this specific example, for instance, the UI window 102A has been brought to the foreground. Other types of user input gestures can cause other types of operations to be performed on the on-screen UI elements in other embodiments.

Figure 1D:
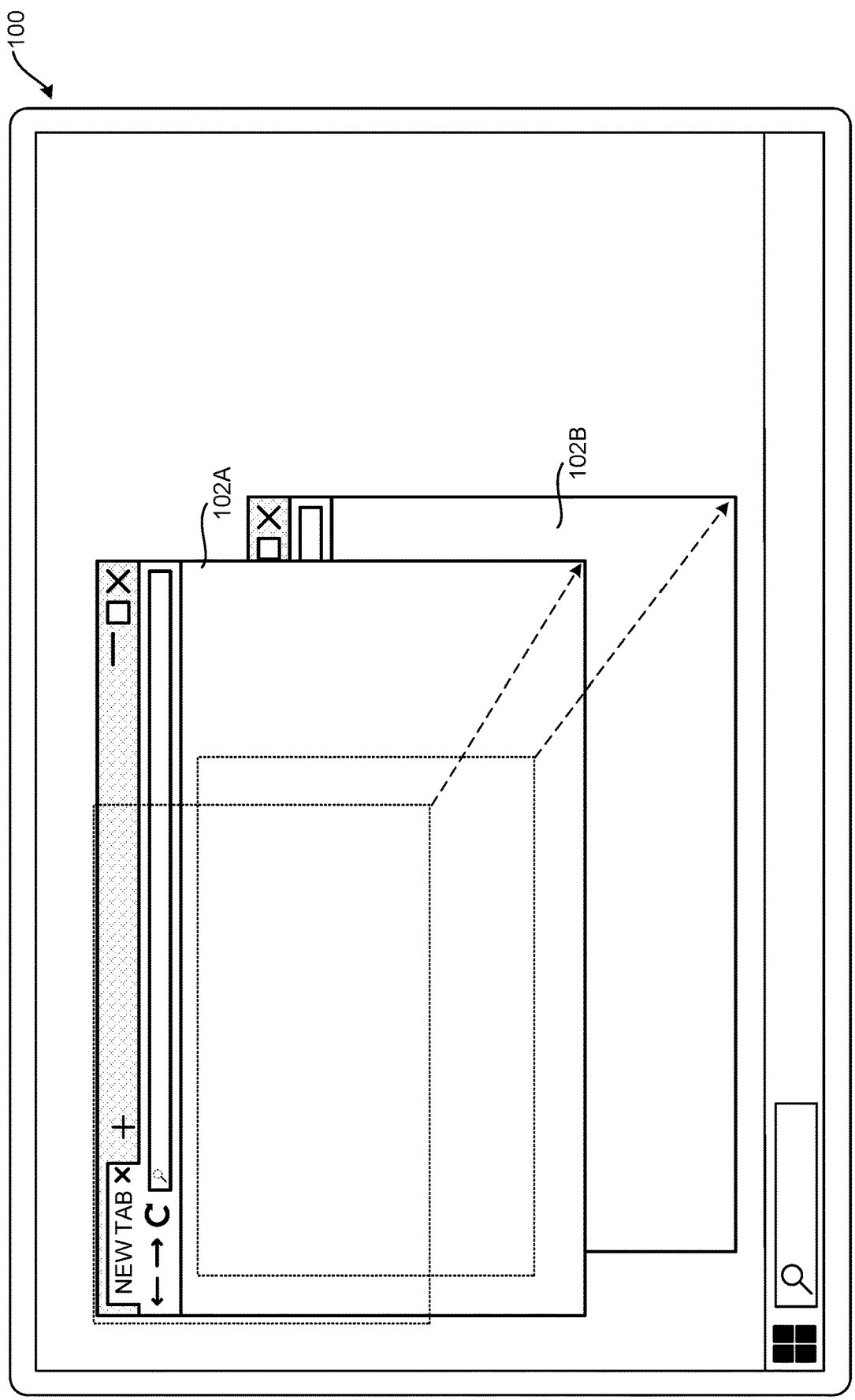
FIG. 1D is a UI diagram illustrating additional aspects of the mechanism shown in FIGS. 1A-1C for providing visual feedback during touch-based operations on UI elements, according to one embodiment disclosed herein.

Following the performance of the operation triggered by the second user input gesture, the UI element, or UI elements, can be returned to its original size. For instance, in the example shown in FIG. 1D, the user has completed the three-finger drag gesture and removed their fingers from the display of the device 100. In response thereto, the UI windows 102A and 102B have been returned to their original size as illustrated in FIG. 1D. The dotted lines in FIG. 1D illustrate the reduced size of the UI windows 102A and 102B.

Figure 2:
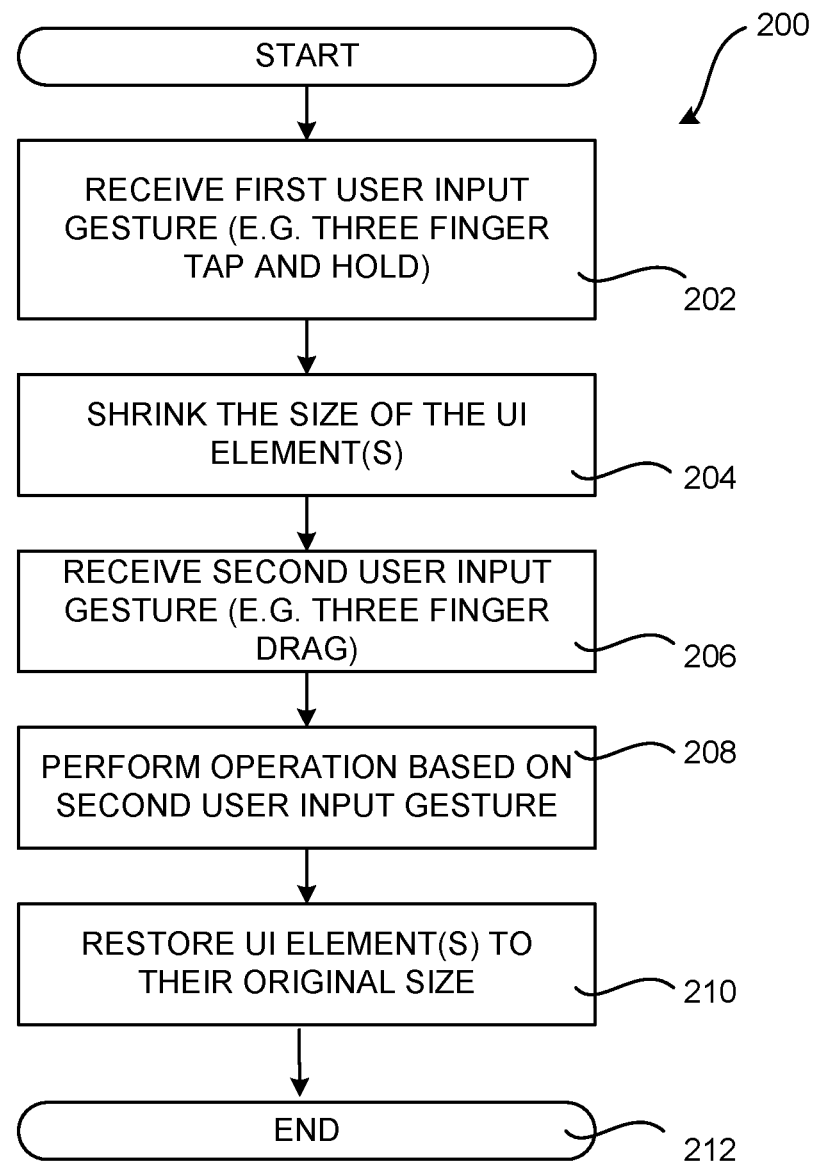
FIG. 2 is a flow diagram illustrating aspects of one illustrative routine disclosed herein for providing visual feedback during touch-based operations on UI elements, according to the embodiment described with reference to FIGS. 1A-1D.

FIG. 2 is a flow diagram showing a routine 200 that illustrates aspects of the operation of the mechanism disclosed herein with reference to FIGS. 1A-1D for providing visual feedback during touch-based operations on UI elements. It should be appreciated that the logical operations described herein with regard to FIG. 2, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 200 begins at operation 202, where a first user input gesture is received at a touch-enabled computing device 100. For instance, in the example shown in FIGS. 1A-1D and described above, the first user input gesture is a three-finger tap and hold gesture. In response thereto, the routine 200 proceeds from operation 202 to operation 204 where the size of on-screen UI elements, such as the UI windows 102A and 102B, are reduced, or shrunk, from their original size. As mentioned above, reducing the size of the UI elements in this manner can indicate to a user that a subsequent user input gesture will operate on the reduced-size UI elements.

From operation 204, the routine 200 proceeds to operation 206, where a second user input gesture is received by way of the touch-enabled display of the computing device 100. In the example shown in FIGS. 1A-1D, this gesture is a three-finger drag gesture. In response thereto, the computing device 100 performs an operation on some or all of the displayed UI elements. In the example described above, for instance, the operation causes the most recently used UI element to be moved to the foreground. Other types of operations can be performed in other embodiments.

Following the completion of the operation initiated by the second user input gesture, the routine 200 proceeds to operation 210, where the UI elements are restored to their original size as shown in FIG. 1D and described above. The routine 200 then proceeds from operation 210 to operation 212, where it ends.

FIGS. 3A-3E are UI diagrams illustrating aspects of one mechanism disclosed herein for providing visual feedback during touch-based movement of a UI element, according to one embodiment disclosed herein. In this embodiment, an additional visual indication can be provided during an operation for selecting and moving a UI element to assist the user. Details regarding the provision of this additional visual indication are provided below with regard to FIGS. 3A-4.

Figure 3A:
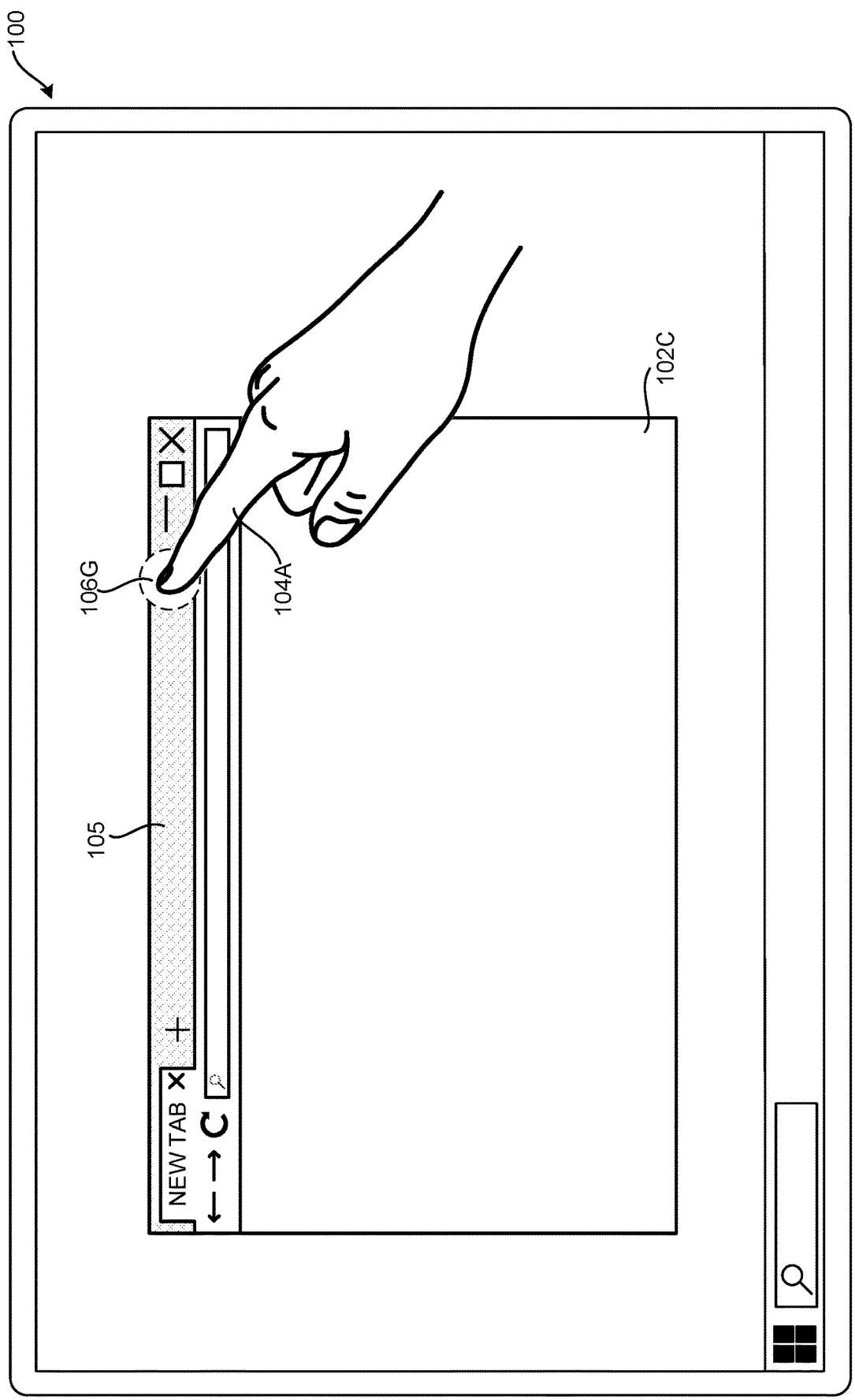
FIG. 3A is a UI diagram illustrating aspects of one mechanism disclosed herein for providing visual feedback during touch-based movement of a UI element, according to one embodiment disclosed herein.

As illustrated in the example shown in FIG. 3A, a user input gesture might be received in an area of a UI element designated for performing a move operation on the UI element. For instance, in the illustrated example a user has performed a one-finger tap and hold gesture using their index finger 104A at the location 106G. In this example, the one-finger tap and hold gesture has been targeted to a portion of the UI window 102C that is designated for selecting and moving the UI window 102C (e.g., the title bar 105). Other portions of other UI elements can be designated for initiating and performing a move operation in a similar manner.

Figure 3B:
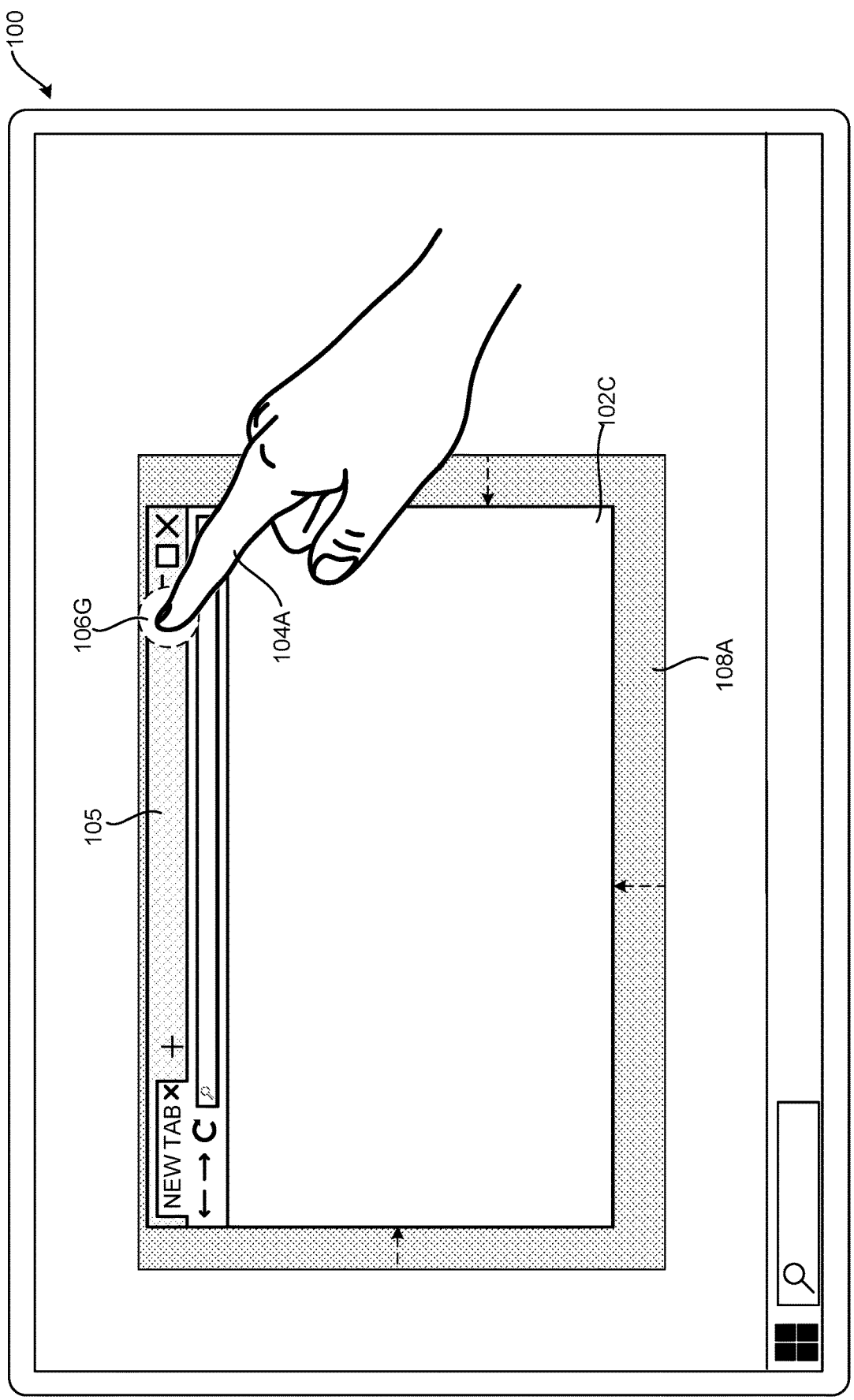
FIG. 3B is a UI diagram illustrating additional aspects of the mechanism shown in FIG. 3A for providing visual feedback during touch-based movement of a UI element, according to one embodiment disclosed herein.
Figure 3C:
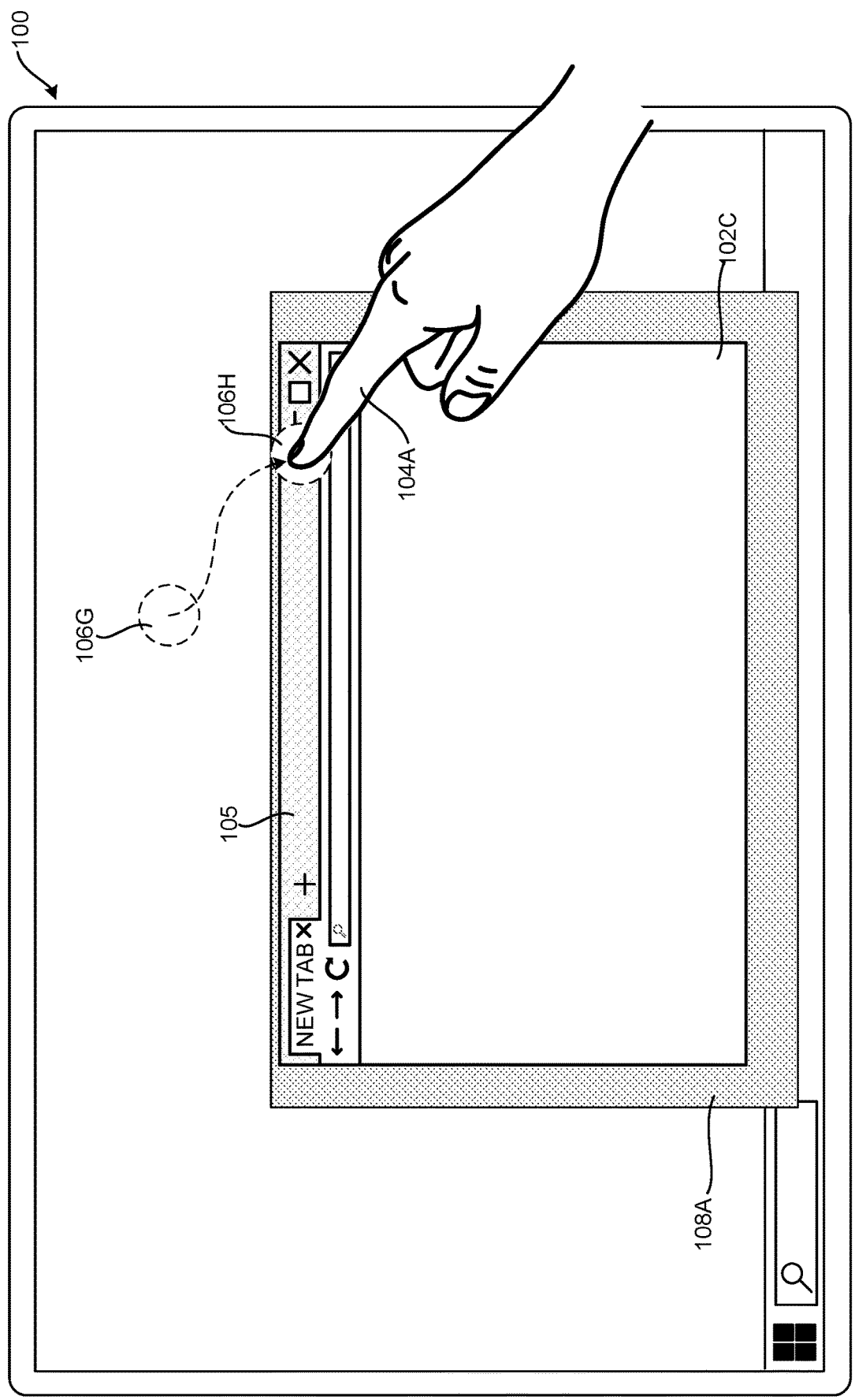
FIG. 3C is a UI diagram illustrating additional aspects of the mechanism shown in FIGS. 3A and 3B for providing visual feedback during touch-based movement of a UI element, according to one embodiment disclosed herein.
Figure 3D:
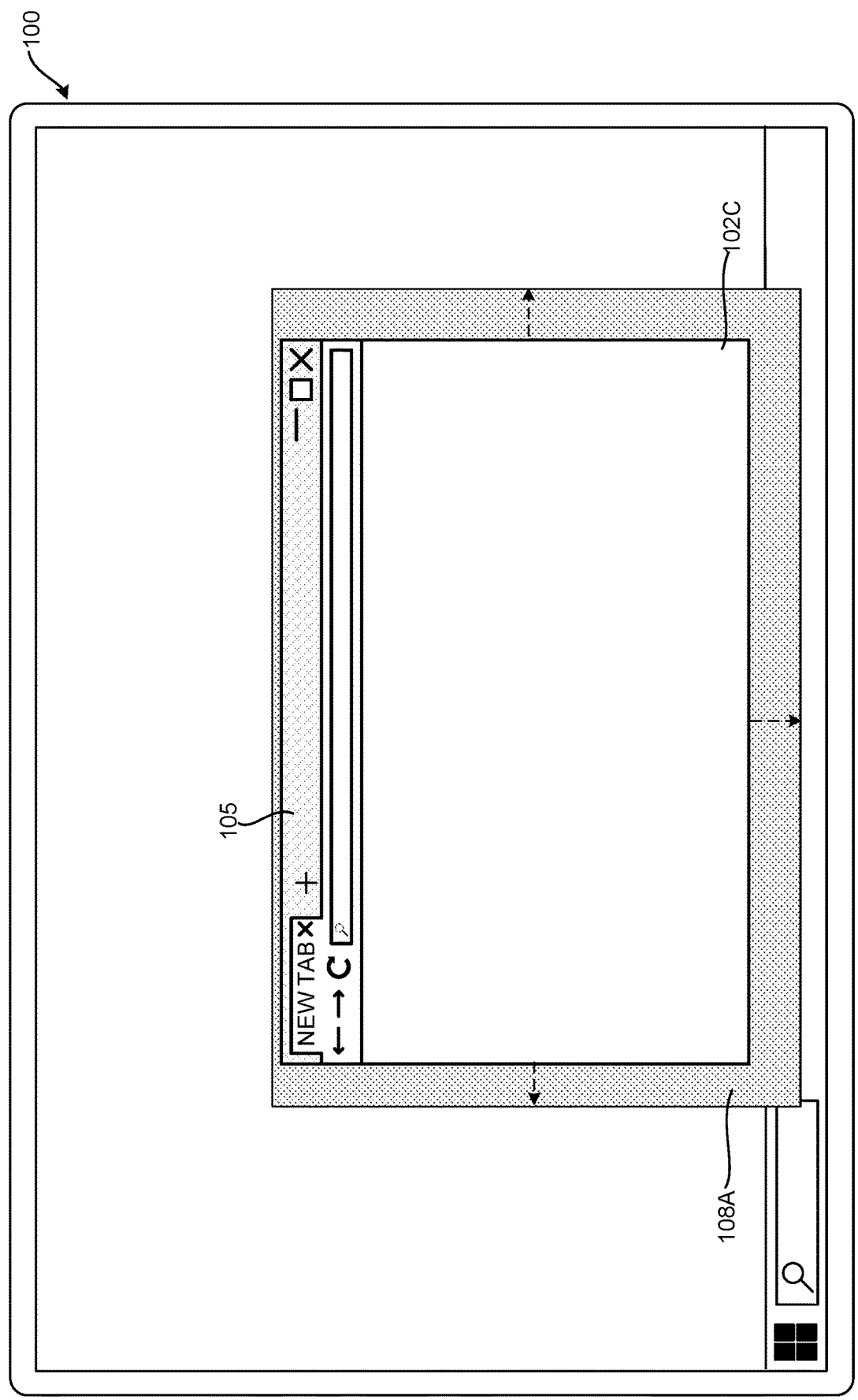
FIG. 3D is a UI diagram illustrating additional aspects of the mechanism shown in FIGS. 3A-3C for providing visual feedback during touch-based movement of a UI element, according to one embodiment disclosed herein.

As shown in FIG. 3B, the size of the UI element can be reduced in the manner described above in response to the initiation of the user input gesture. For instance, in the example shown in FIG. 3B, the size of the UI window 102C has been reduced in response to the performance of the one-finger tap and hold gesture. The reduction in size of the UI window 101C is illustrated by the arrows shown in FIG. 3B. Additionally, in some embodiments, a visual indicator 108A might be presented that surrounds the UI element. The size of the visual indicator is the same as the UI element before it was reduced in size in some embodiments.

In the embodiment shown in FIG. 3B, for example, the visual indicator 108A is a colored rectangle that surrounds the UI window 102C. The visual indicator 108A extends beyond the edges of the UI window 102C on all four sides. In some embodiments, the visual indicator 108A is translucent such that UI objects beneath the visual indicator 108A can still be seen. Other types of visual indicators 108A can be provided for other types of UI elements in other embodiments.

It is to be appreciated that the visual indicator 108A can be displayed in various ways in various embodiments. For example, and without limitation, a screenshot of the UI window 102 might be taken and scaled down to the appropriate size. The visual indicator 108A can then be displayed as a separate UI element associated with the reduced size screenshot of the UI window 102. Alternately, a single new UI element might be presented that comprises the reduced size UI window 102 and the visual indicator 108A. Other mechanisms can be used in other implementations.

Following the one-finger tap and hold gesture described above, a user might perform a one finger drag gesture in order to move the selected UI element to a new location. For instance, in the example shown in FIG. 3C, the user has performed a one finger drag gesture by moving their index finger 104A from the location 106G to the location 106H. In response thereto, the UI window 102C has been moved to a new location. The visual indicator 108A moves with the UI window 102C as it is repositioned.

The visual indicator 108A provides an indication to the user that the UI window 102C has been selected. Moreover, in embodiments where the visual indicator 108A is the same size as the UI window 102A before it was reduced in size, the visual indicator 108A provides an indication to the user of the size that the UI window 102C will be when the move operation is completed. This can help a user to place the UI window 102C at the precise location that the user desires.

When the user has completed the move operation, the UI element is returned to its original size and the visual indicator is removed. For instance, in the example shown in FIG. 3D, the user has completed the one finger drag gesture and removed their finger from the display of the device 100. In response thereto, the UI window 102C is returned to its original size (as illustrated by the arrows in FIG. 3D) and presented at its new location as shown in FIG. 3E.

Figure 4:
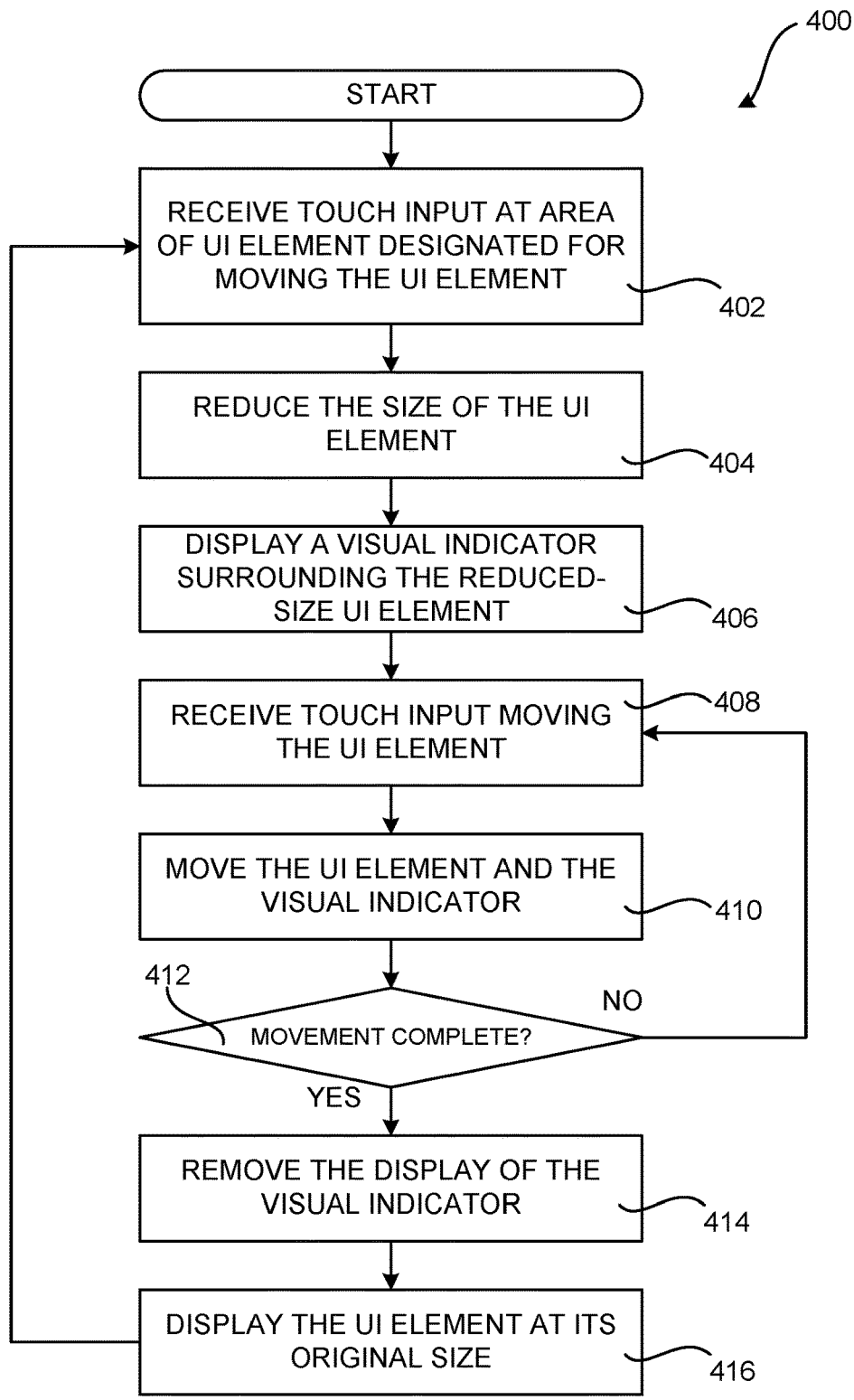
FIG. 4 is a flow diagram illustrating aspects of one illustrative routine disclosed herein for providing visual feedback during touch-based movement of a UI element, according to the embodiment described with reference to FIGS. 3A-3E.

FIG. 4 is a flow diagram illustrating aspects of one illustrative routine 400 disclosed herein for providing visual feedback during touch-based movement of a UI element, according to the embodiment described above with reference to FIGS. 3A-3E. The routine 400 begins at operation 402, where a user input gesture is received in an area of a UI element that is designated for moving the UI element, such as the title bar 105 of a UI window 102C in the example described above.

In response to receiving the user input gesture at operation 402, the routine 400 proceeds to operation 404, where the size of the UI element is reduced in the manner described above. The routine 400 then proceeds to operation 406, where a visual indicator 108A is displayed that surrounds the reduced sized UI element, also in the manner described above. From operation 406, the routine 400 proceeds to operation 408.

At operation 408, a user input gesture is received for moving the selected UI element, such as a one finger drag gesture. In response thereto, the UI element is moved to the desired location at operation 410. As discussed above, the visual indicator 108A is also moved with the UI element as it is relocated.

At operation 412, a determination is made as to whether the gesture for moving the UI element has been completed. If so, the routine 400 proceeds to operation 414, where the display of the visual indicator 108A is removed. The routine 400 then proceeds from operation 414 to operation 416, where the UI element is returned to its original size. From operation 418, the routine 400 proceeds back to operation 402, where additional UI elements might be moved in a similar fashion.

FIGS. 5A-7D are UI diagrams illustrating aspects of several mechanisms disclosed herein for providing visual feedback during touch-based resizing of a UI element, according to one embodiment disclosed herein. In these embodiments, the disclosed technologies provide visual feedback during a touch-based operation in order to clearly indicate to a user the portion of a UI element that has been selected and is to be resized. For instance, when a user resizes a UI element by selecting an edge of the UI element a visual indicator can be presented along the edge of the UI element that is to be resized.

FIGS. 5A-5D illustrate resizing a window 102D by performing a user input gesture on the right edge of the UI window 102D. In the example shown in FIG. 5A, for instance, a UI window 102C has been displayed on the touch-sensitive display of a touch-enabled computing device 100. Additionally, a first user input gesture has been received at a portion of the UI window 102D that has been designated for resizing the UI window 102D. In this particular example, the gesture is a tap and hold gesture using a finger 104A at a location 106I on the right edge of the UI window 102D.

Figure 5A:
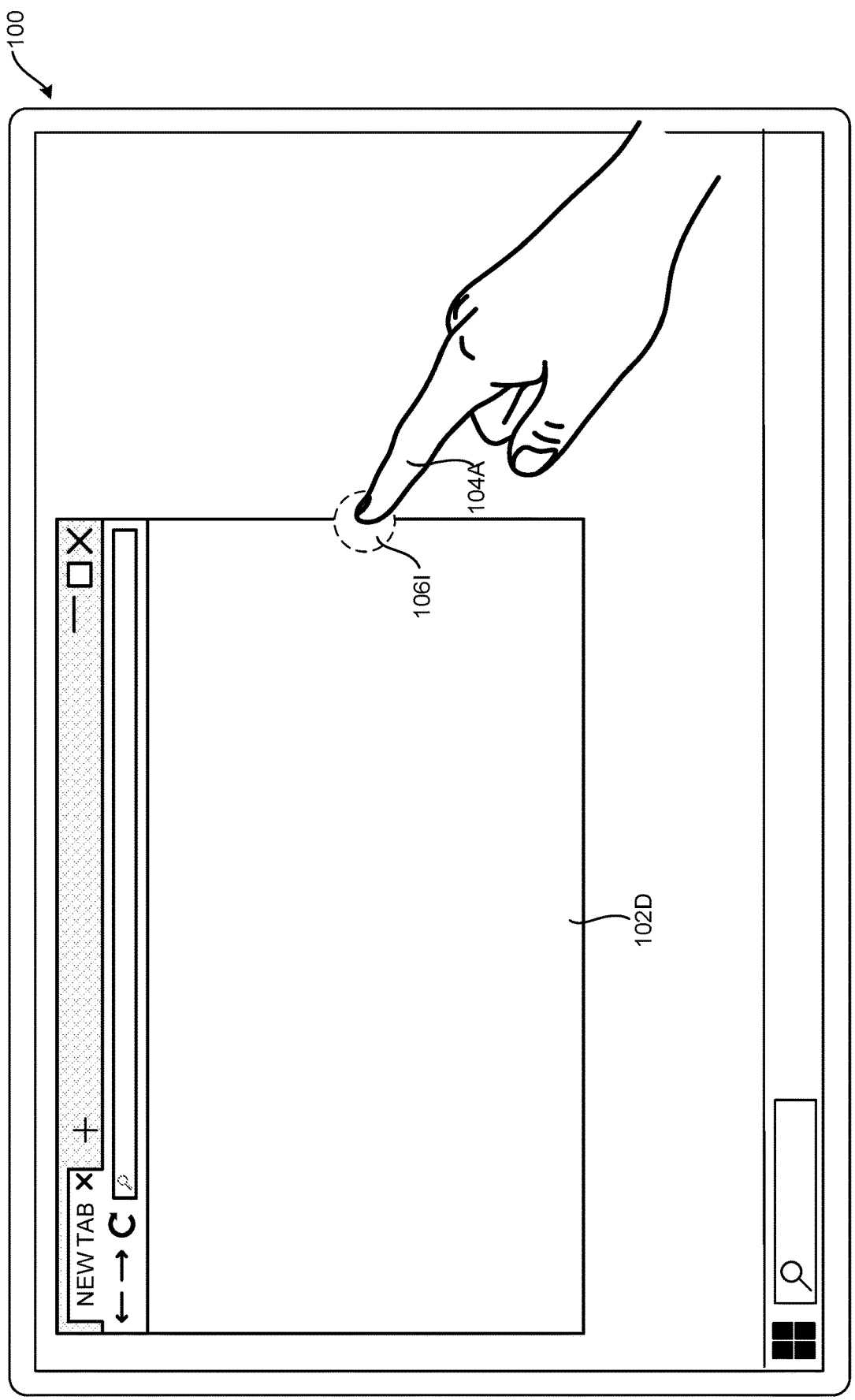
FIG. 5A is a UI diagram illustrating aspects of one mechanism disclosed herein for providing visual feedback during touch-based resizing of a UI element, according to one embodiment disclosed herein.

In the case of a UI window 102D, such as that shown in FIG. 5A, having a left edge, a right edge, a bottom edge, and a top edge, the first user input gesture may be made at any of the edges of the UI window 102D. Other locations on other types of UI elements might be designated for performing resizing operations.

Figure 5B:
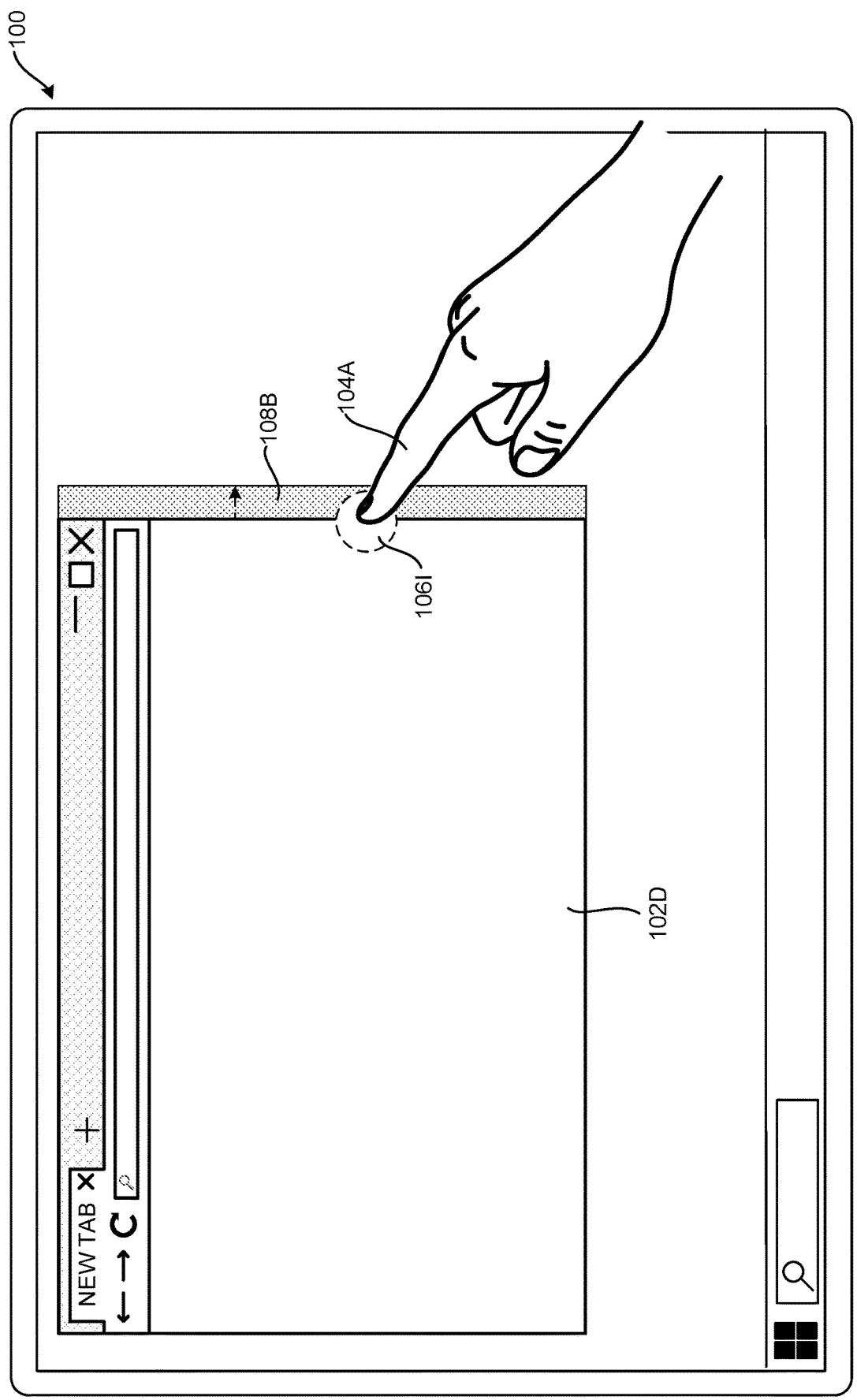
FIG. 5B is a UI diagram illustrating additional aspects of the mechanism shown in FIG. 5A for providing visual feedback during touch-based resizing of a UI element, according to one embodiment disclosed herein.

In response to receiving the first user input gesture, a visual indicator 108B may be displayed along the length of the selected edge of the UI element. As shown in FIG. 5B, for instance, in the case of the UI window 102D, the visual indicator 108B might be a colored rectangle that extends along all or a portion of the length of the selected side of the UI window 102D. In some embodiments, the visual indicator 108B is translucent such that UI objects beneath the visual indicator 108B can still be seen. Other types of visual indicators 108B can be provided to visually identify a selected edge of other types of UI elements in other embodiments.

Figure 5C:
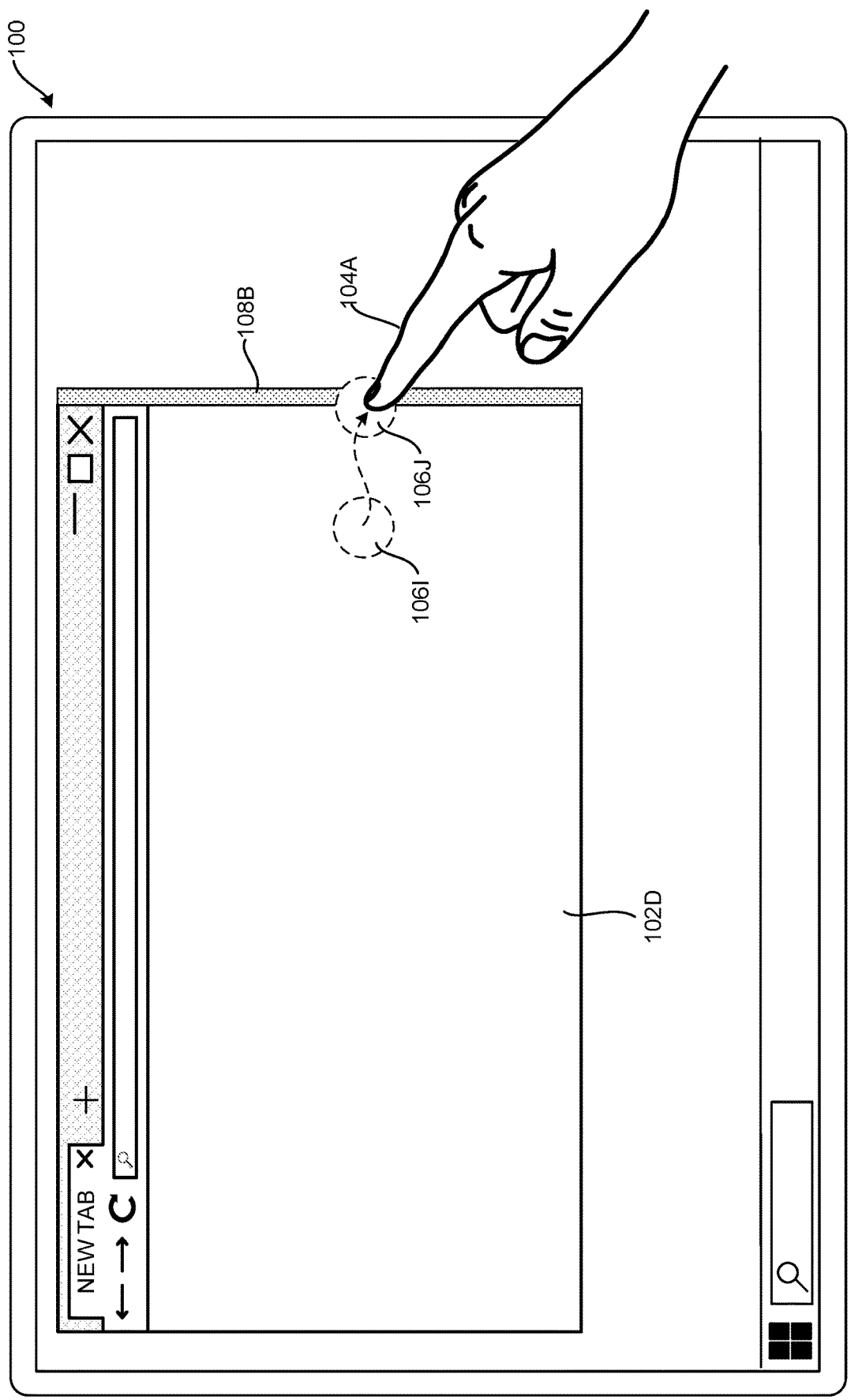
FIG. 5C is a UI diagram illustrating additional aspects of the mechanism shown in FIGS. 5A and 5B for providing visual feedback during touch-based resizing of a UI element, according to one embodiment disclosed herein.
Figure 5D:
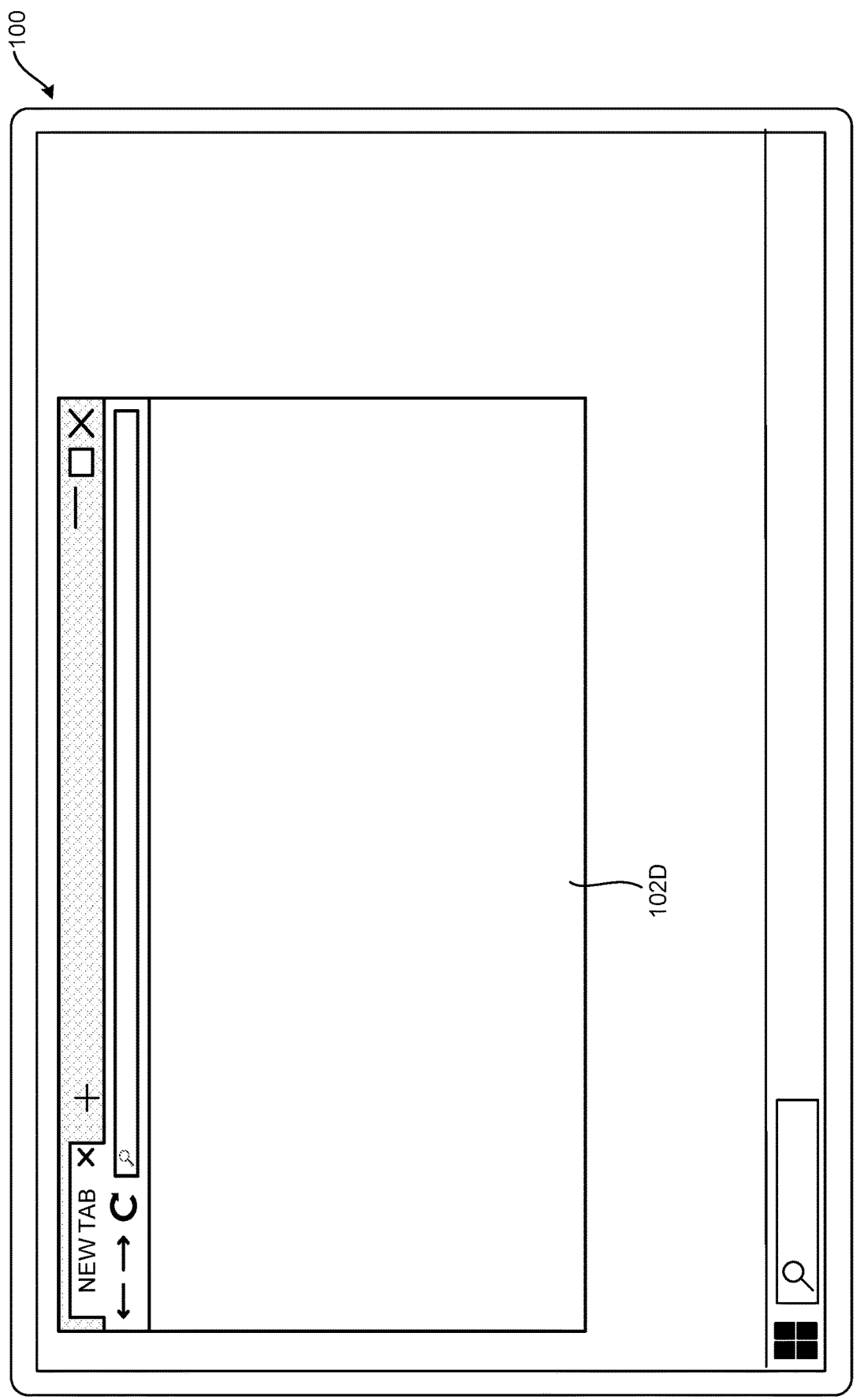
FIG. 5D is a UI diagram illustrating additional aspects of the mechanism shown in FIGS. 5A-5C for providing visual feedback during touch-based resizing of a UI element, according to one embodiment disclosed herein.

Subsequently, a second user input gesture may be received to resize the UI element such as, for example, a one finger drag gesture. As shown in FIG. 5C, for instance, a user might drag their finger 104A from the location 106I to a new location 106J to resize the UI window 102D in the direction of the drag gesture. The visual indicator 108B is displayed along the selected edge of the UI window 102D during the resizing of the UI window 102D. As shown in FIG. 5C, the size of the visual indicator 108B can be reduced during the resizing operation in some embodiments. Once the resizing operation performed in response to the second user input gesture is complete, the visual indicator 108B is removed as illustrated in FIG. 5D.

Figure 6A:
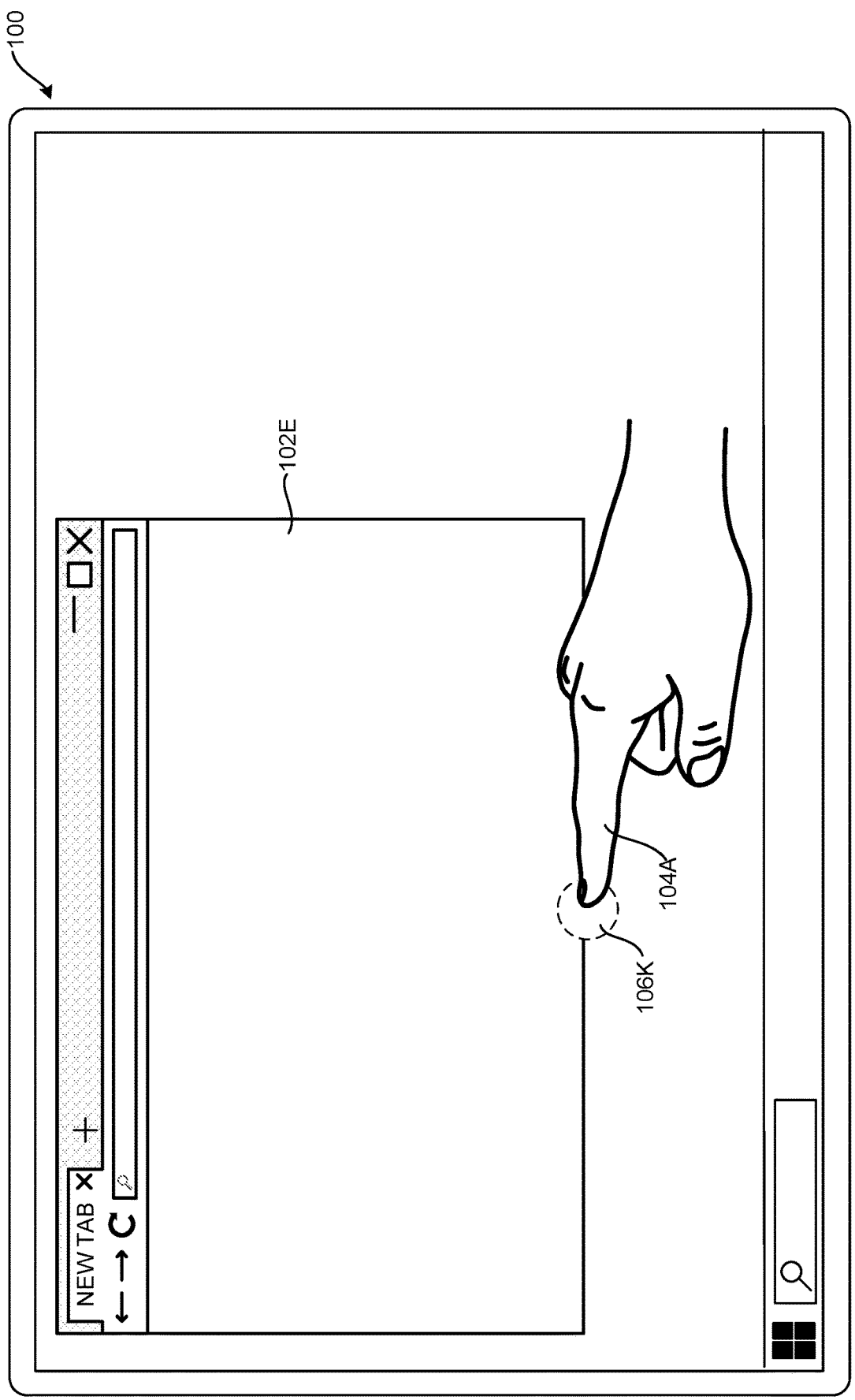
FIG. 6A is a UI diagram illustrating aspects of another mechanism disclosed herein for providing visual feedback during touch-based resizing of a UI element, according to one embodiment disclosed herein.
Figure 6B:
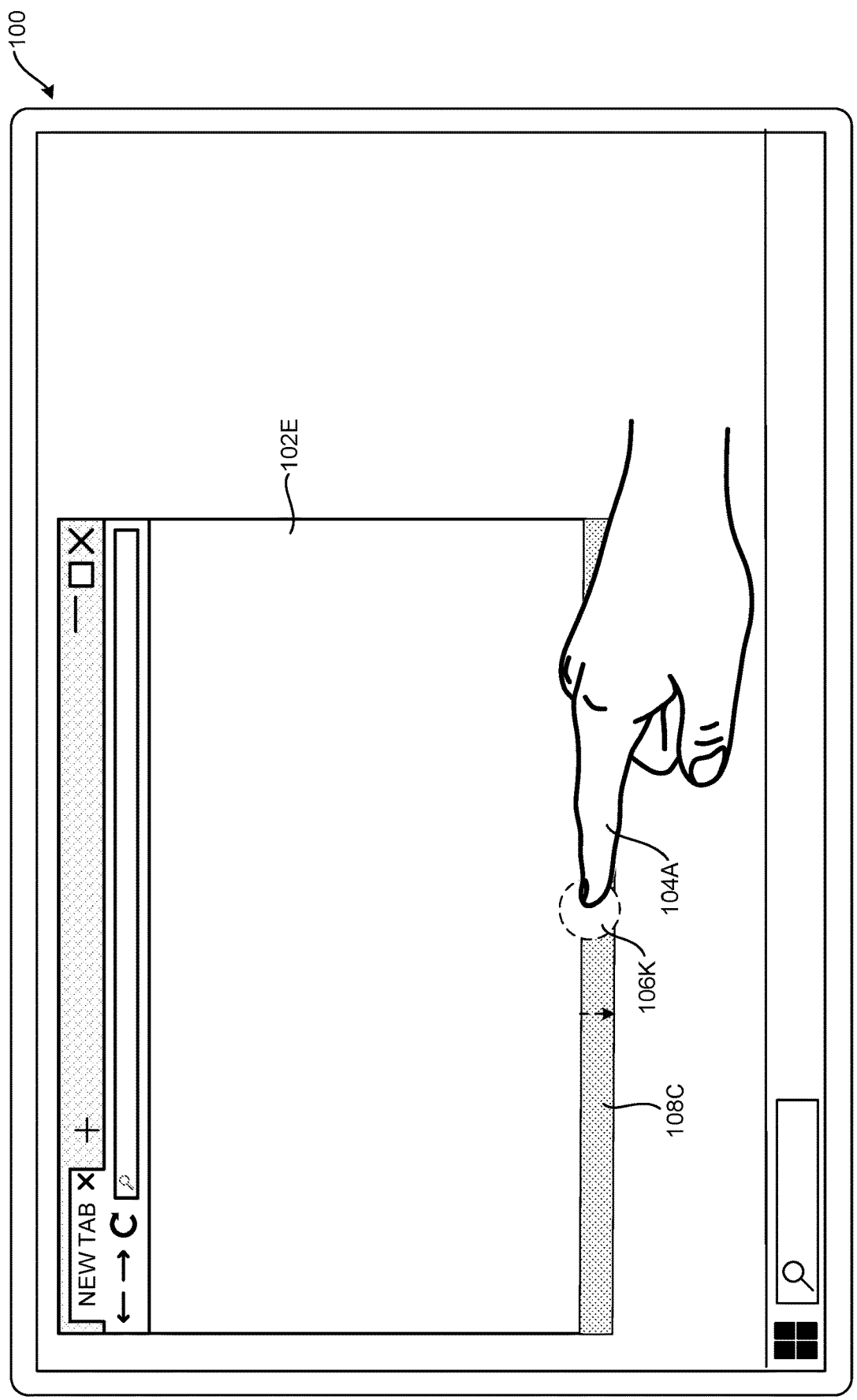
FIG. 6B is a UI diagram illustrating additional aspects of the mechanism shown in FIG. 6A for providing visual feedback during touch-based resizing of a UI element, according to one embodiment disclosed herein.

FIGS. 6A-6D illustrate resizing a UI window 102E by performing a user input gesture on the bottom edge of the UI window 102E. For instance, and as shown in FIG. 6A, a tap and hold gesture using a finger 104A at a location 106K may be received on the bottom edge of the UI window 102E. As in the example above, in response to receiving the first user input gesture, a visual indicator 108C can be displayed along the length of the selected edge of the UI window 102E (i.e., the bottom edge in this example).

Figure 6C:
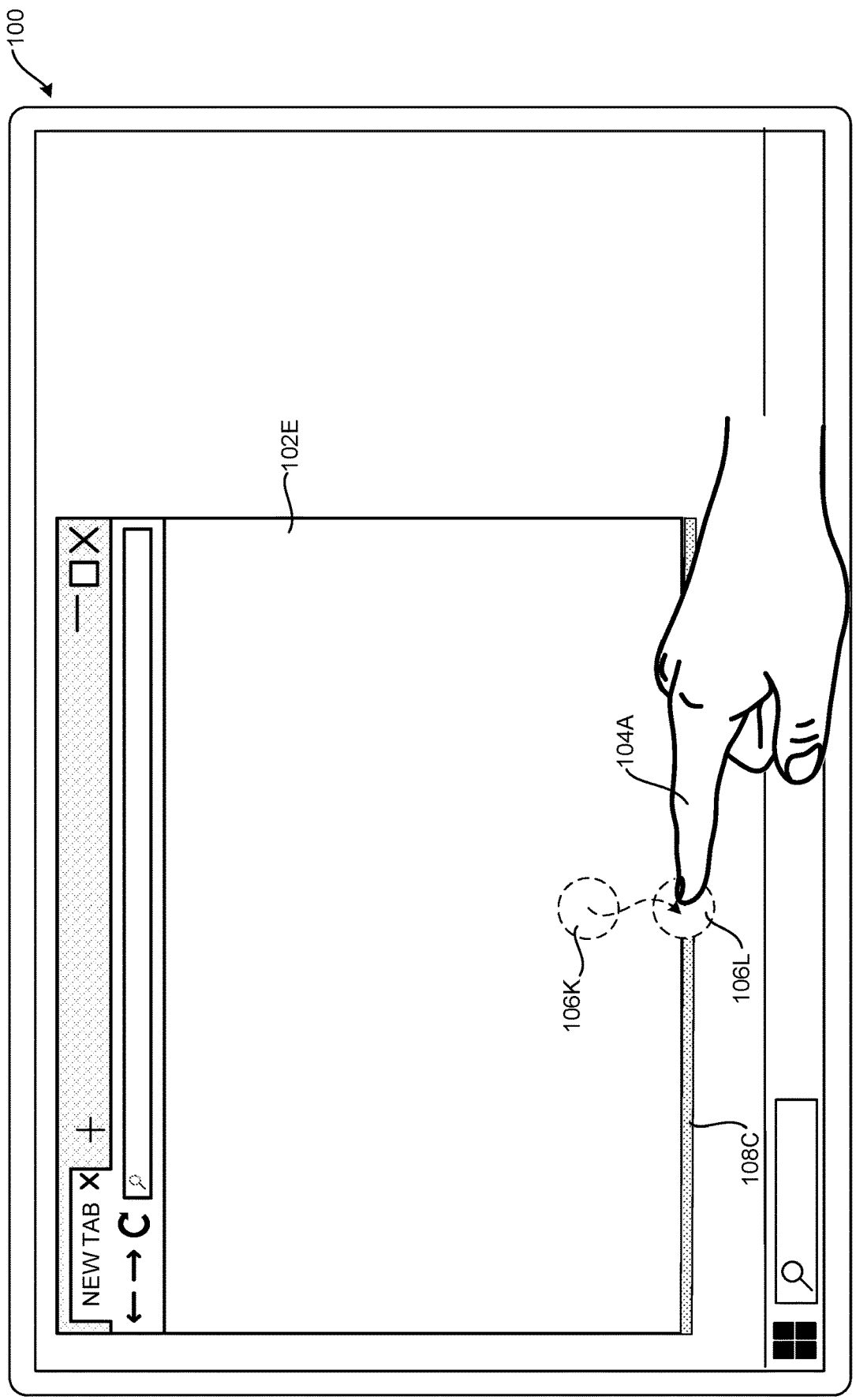
FIG. 6C is a UI diagram illustrating additional aspects of the mechanism shown in FIGS. 6A and 6B for providing visual feedback during touch-based resizing of a UI element, according to one embodiment disclosed herein.

Subsequently, a second user input gesture may be received to resize the UI element such as, for example, a one finger drag gesture. As shown in FIG. 6C, for instance, a user might drag their finger 104A from the location 106K to a new location 106L to resize the UI window 102E in the direction of the drag gesture. In this example, the visual indicator 108C is displayed along the selected edge of the UI window 102E during the resizing of the UI window 102E. As shown in FIG. 6C, the size of the visual indicator 108C can be reduced during the resizing operation.

Figure 6D:
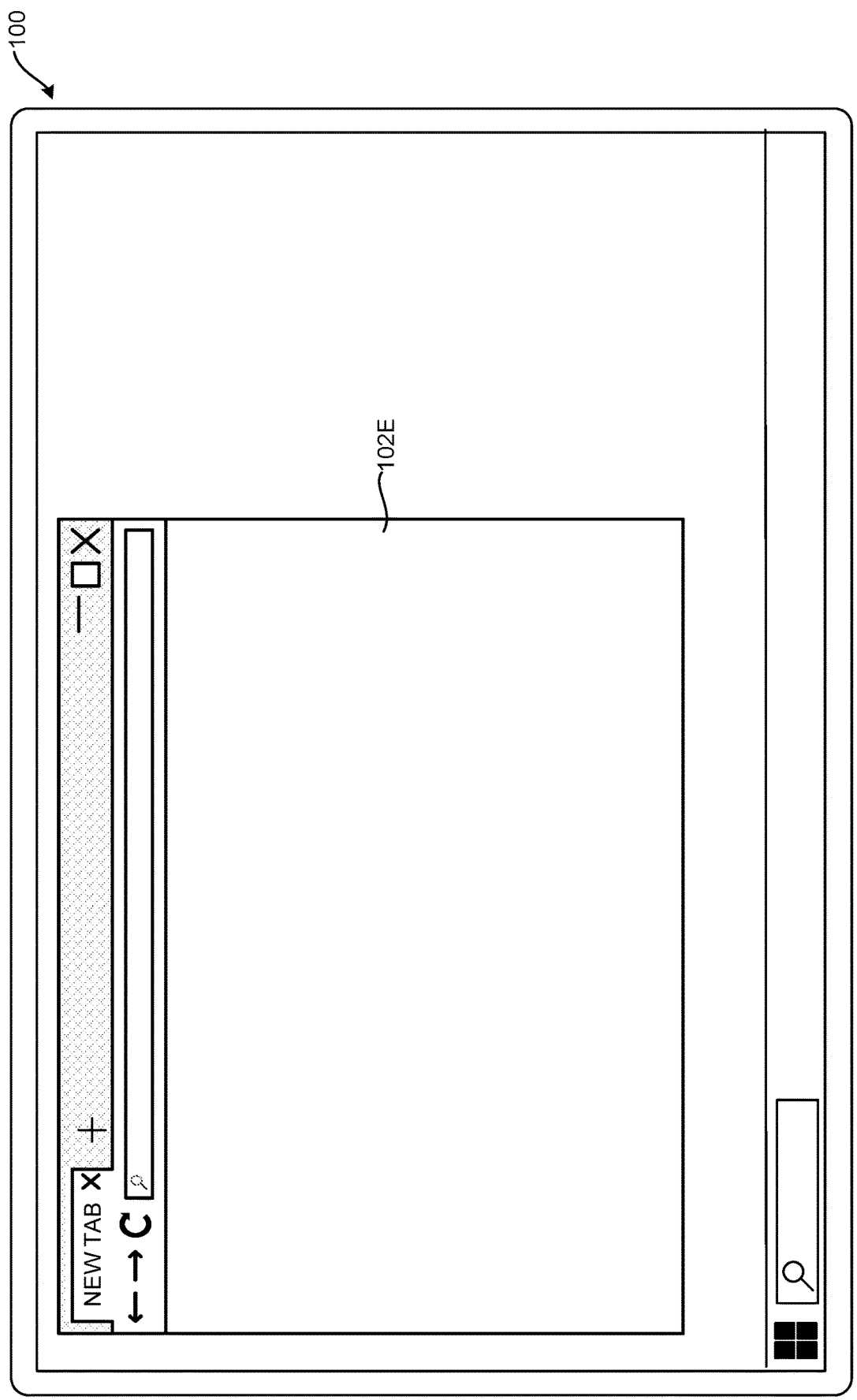
FIG. 6D is a UI diagram illustrating additional aspects of the mechanism shown in FIGS. 6A-6C for providing visual feedback during touch-based resizing of a UI element, according to one embodiment disclosed herein.

Once the resizing operation performed in response to the second user input gesture is complete, the visual indicator 108C is removed as illustrated in FIG. 6D. It is to be appreciated that although not shown in the FIGS., similar resizing operations can be performed along the left and top edges of a UI window 102 in other embodiments.

In another embodiment, a user input gesture can be received at a corner of a UI element. For example, in the case of a rectangular UI window, a tap and hold gesture might be received at any of the four corners of the UI window. FIGS. 7A-7D illustrate resizing a UI window 102F by performing a user input gesture at a corner of the window 102F. In the example shown in FIG. 7A, for instance, a user input gesture (i.e., a one finger tap and hold gesture using a finger 104A) has been received at a location 106M coincident with the lower right hand corner of the UI window 102F.

In response to receiving a user input gesture at a corner of a UI element, visual indicators can be displayed along the edges of the UI element that intersect the selected corner of the UI element. For instance, in the example shown in FIG. 7B, visual indicators 108D and 108E have been displayed along the right and bottom edges of the UI window 102F, respectively, in response to the user input gesture selecting the lower right hand corner of the UI window 102F. The visual indicators 108D and 108E in this example indicate to the user the two sides of the UI element that will be resized by a subsequent drag gesture.

Subsequently, a second user input gesture may be received to resize the UI element such as, for example, a one finger drag gesture. For instance, in the example shown in FIG. 7C, a user has dragged their finger 104A from the location 106M to the location 106N. In response to receiving such a gesture, the UI window 102F is resized in the direction of the gesture.

Figure 7A:
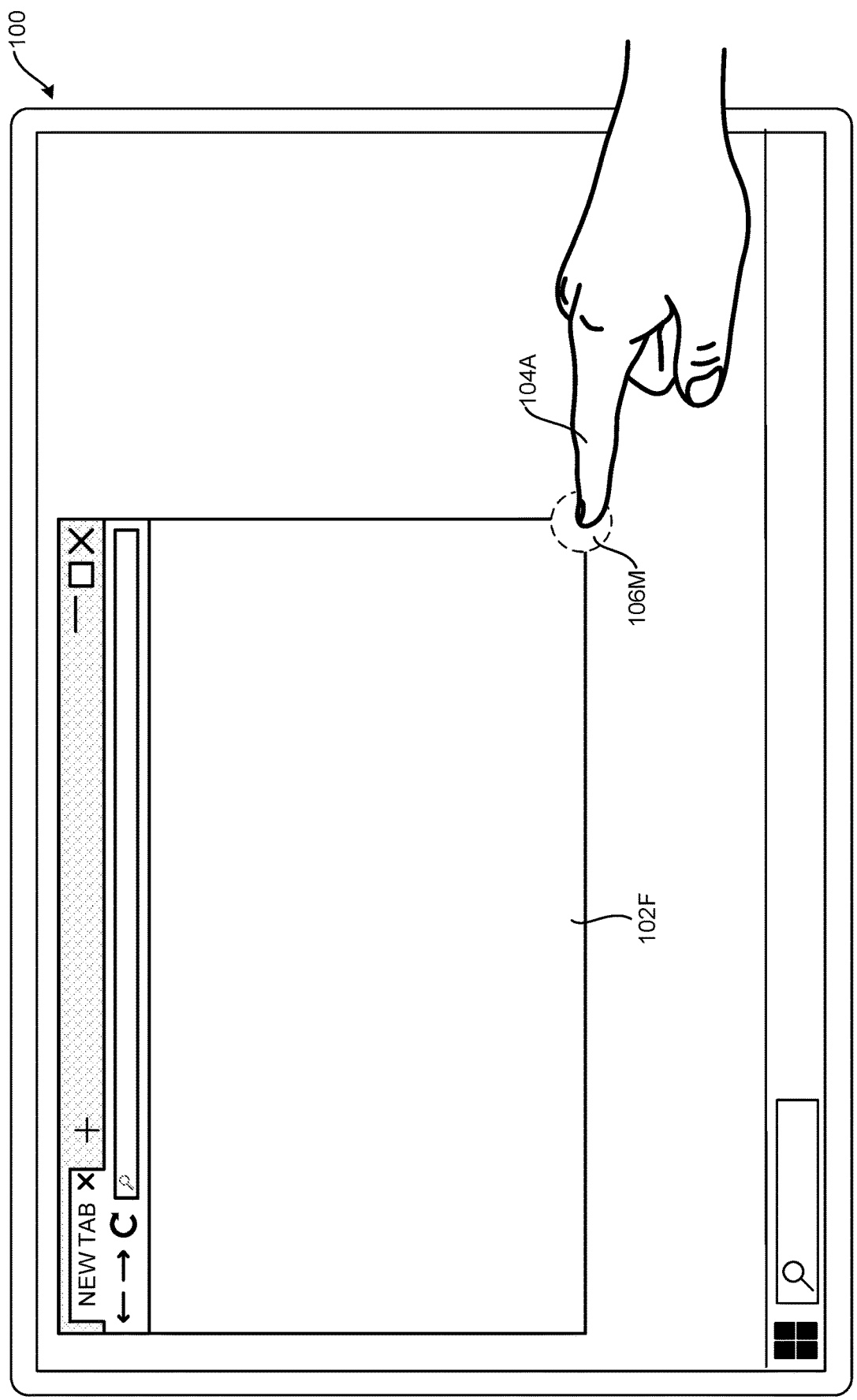
FIG. 7A is a UI diagram illustrating aspects of another mechanism disclosed herein for providing visual feedback during touch-based resizing of a UI element, according to one embodiment disclosed herein.
Figure 7B:
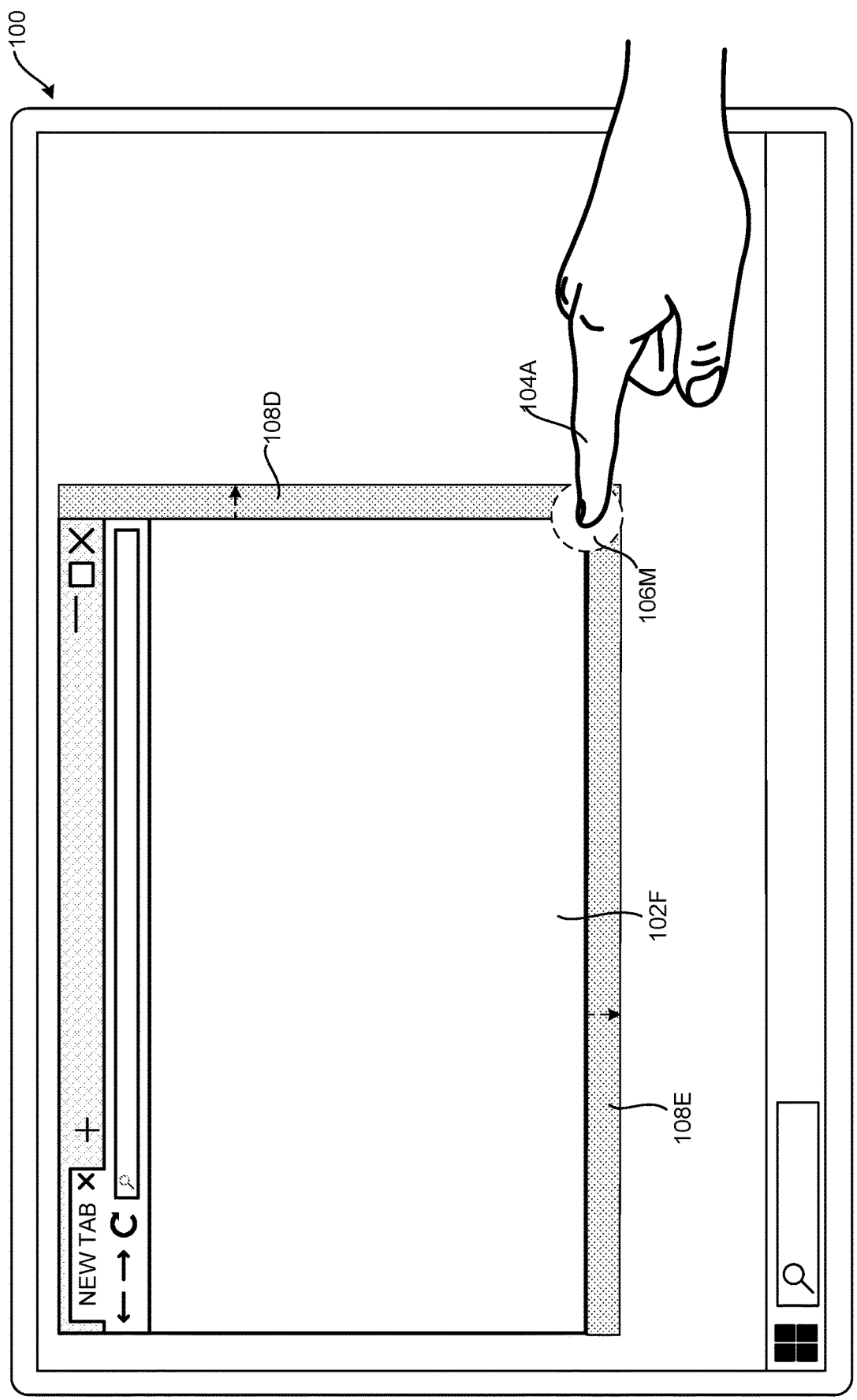
FIG. 7B is a UI diagram illustrating additional aspects of the mechanism shown in FIG. 7A for providing visual feedback during touch-based resizing of a UI element, according to one embodiment disclosed herein.
Figure 7C:
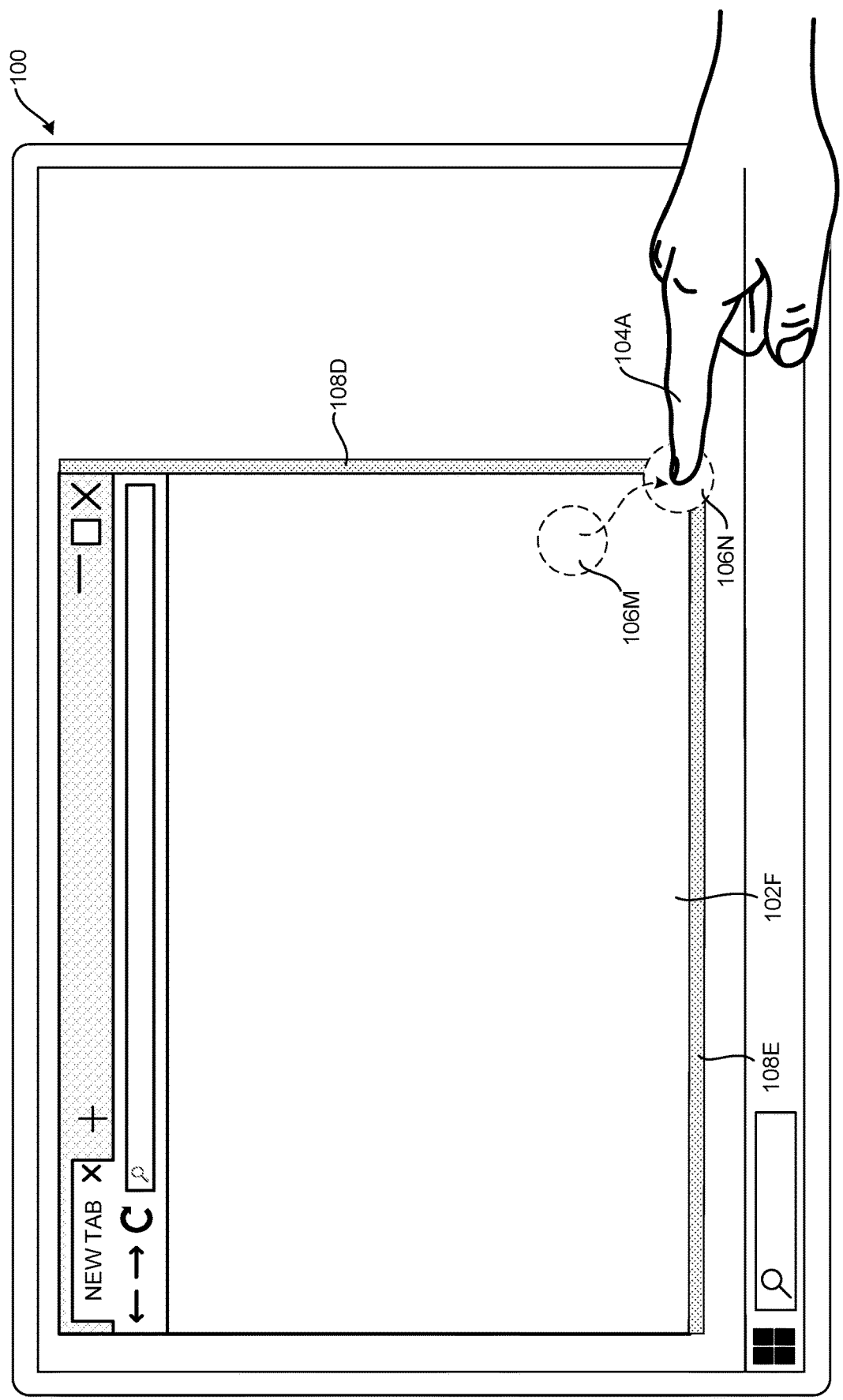
FIG. 7C is a UI diagram illustrating additional aspects of the mechanism shown in FIGS. 7A and 7B for providing visual feedback during touch-based resizing of a UI element, according to one embodiment disclosed herein.
Figure 7D:
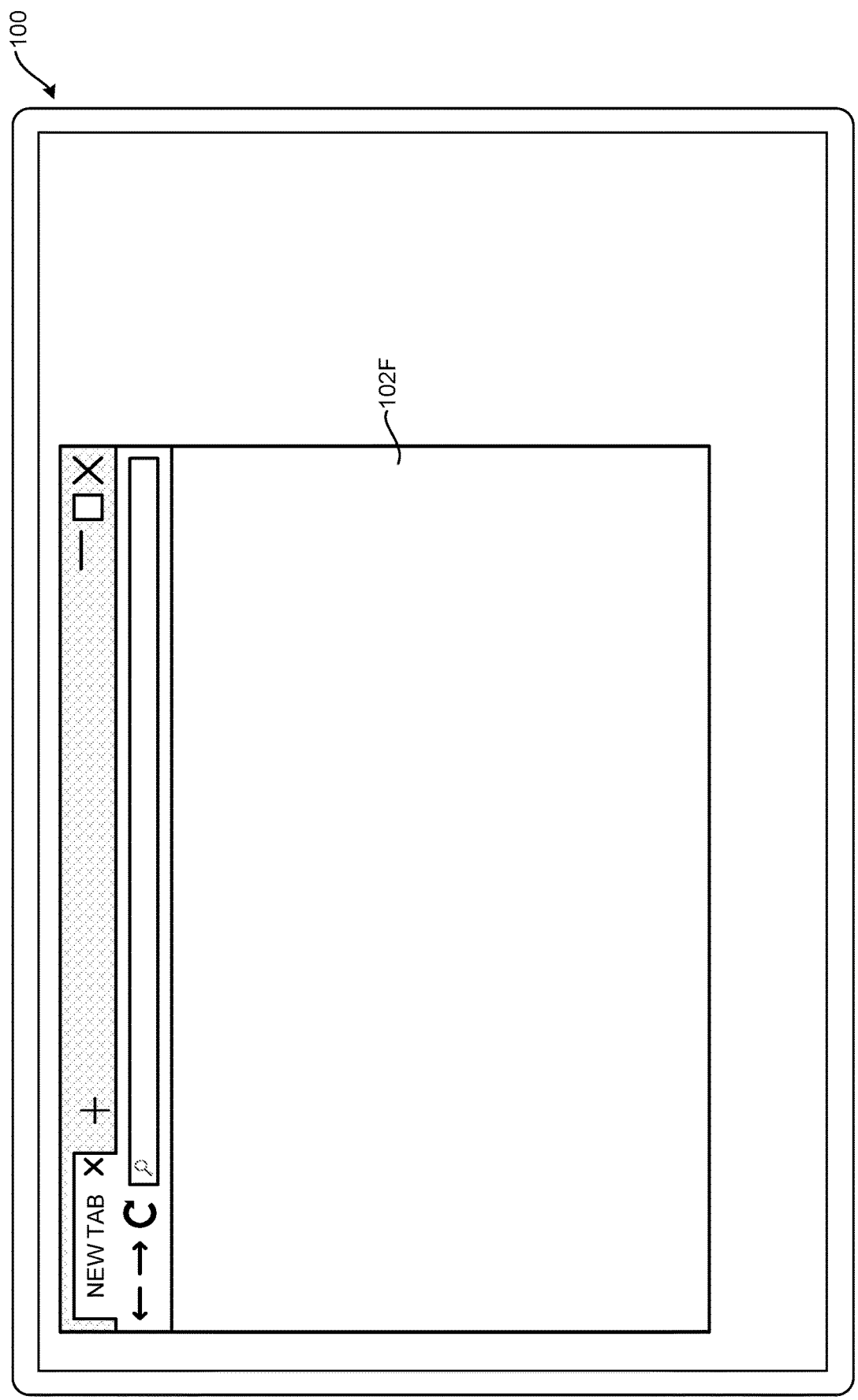
FIG. 7D is a UI diagram illustrating additional aspects of the mechanism shown in FIGS. 7A-7C for providing visual feedback during touch-based resizing of a UI element, according to one embodiment disclosed herein.

As in the examples above, the visual indicators 108D and 108E are displayed along the respective edges of the UI window 102F during the resizing operation. The size of the visual indicators 108D and 108E can also be reduced during the resizing operation as in the examples described above. Once the resizing operation performed in response to the second user input gesture is complete, the visual indicators 108D and 108E are removed as illustrated in FIG. 7D.

Figure 8:
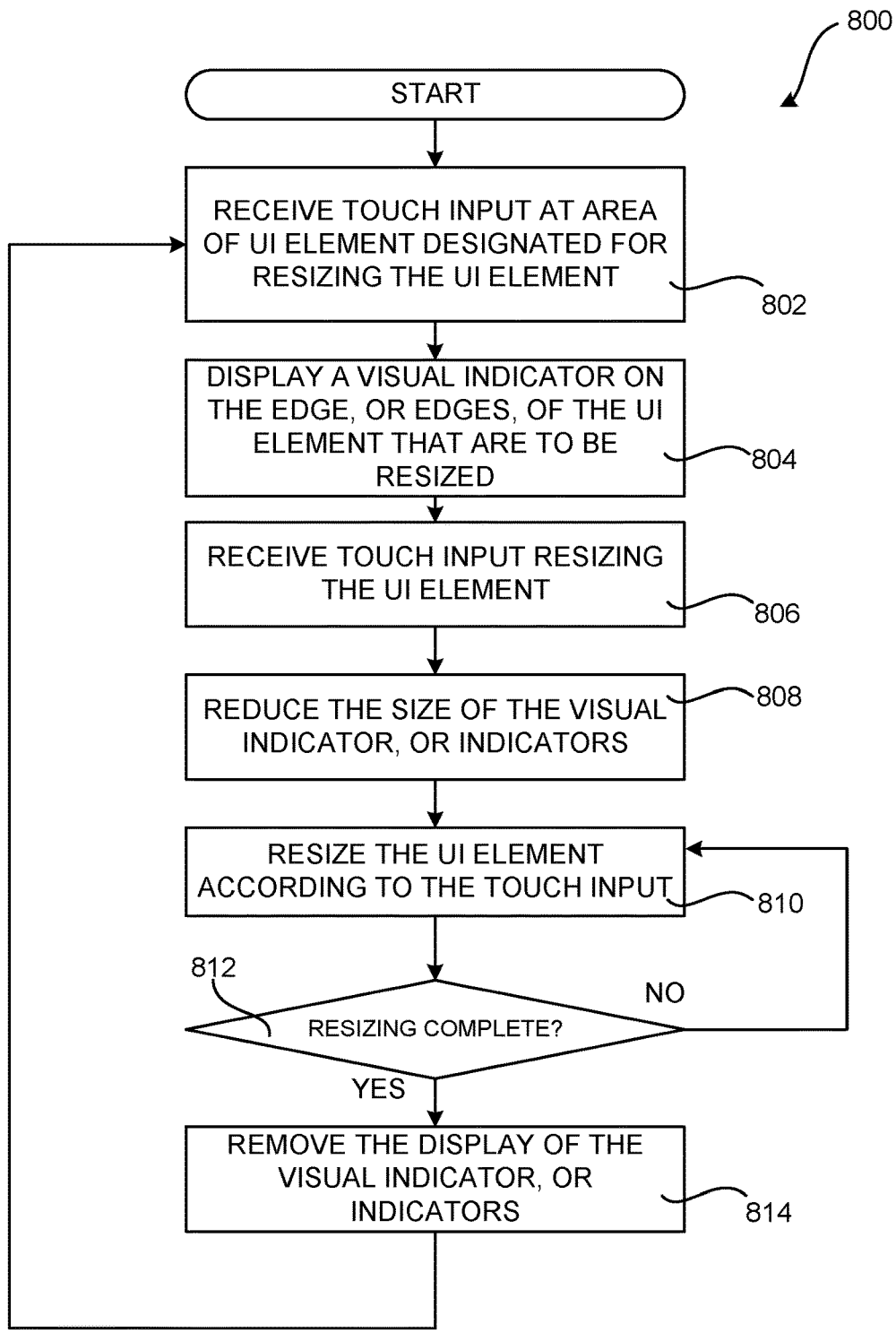
FIG. 8 is a flow diagram illustrating aspects of one illustrative routine disclosed herein for providing visual feedback during touch-based resizing of a UI element, according to the embodiments described with reference to FIGS. 5A-7D.

FIG. 8 is a flow diagram illustrating aspects of one illustrative routine 800 disclosed herein for providing visual feedback during touch-based resizing of a UI element, according to the embodiments described above with reference to FIGS. 5A-7D. The routine 800 begins at operation 802, where touch input is received in an area of a UI element designated for resizing the UI element. For example, in the case of a rectangular UI window 102, the edges and corners of the UI window 102 might be selected and utilized to resize the UI window 102.

In response to receiving a selection of a portion of a UI element designated for performing a resizing operation, the routine 800 proceeds from operation 802 to operation 804, where a visual indicator 108, or indicators 108, is displayed on the selected edge, or edges in the case where a corner is selected, of the UI element. The routine 800 then proceeds from operation 804 to operation 806.

At operation 806, a user input gesture is received for resizing the UI element, such as the one finger drag gesture described above. In response thereto, the routine 800 proceeds to operation 808, where the size of the visual indicator 108, or indicators 108, is reduced in some embodiments. The routine 800 then proceeds from operation 808 to operation 810, where the UI element is resized according to the user input gesture performed at operation 806.

When the user input gesture for resizing the UI element is complete, the routine 800 proceeds from operation 812 to operation 814, where the display of the visual indictor 108, or indicators 108, is removed. The routine 800 then proceeds back to operation 802, where another UI element might be resized in a similar manner.

Figure 9:
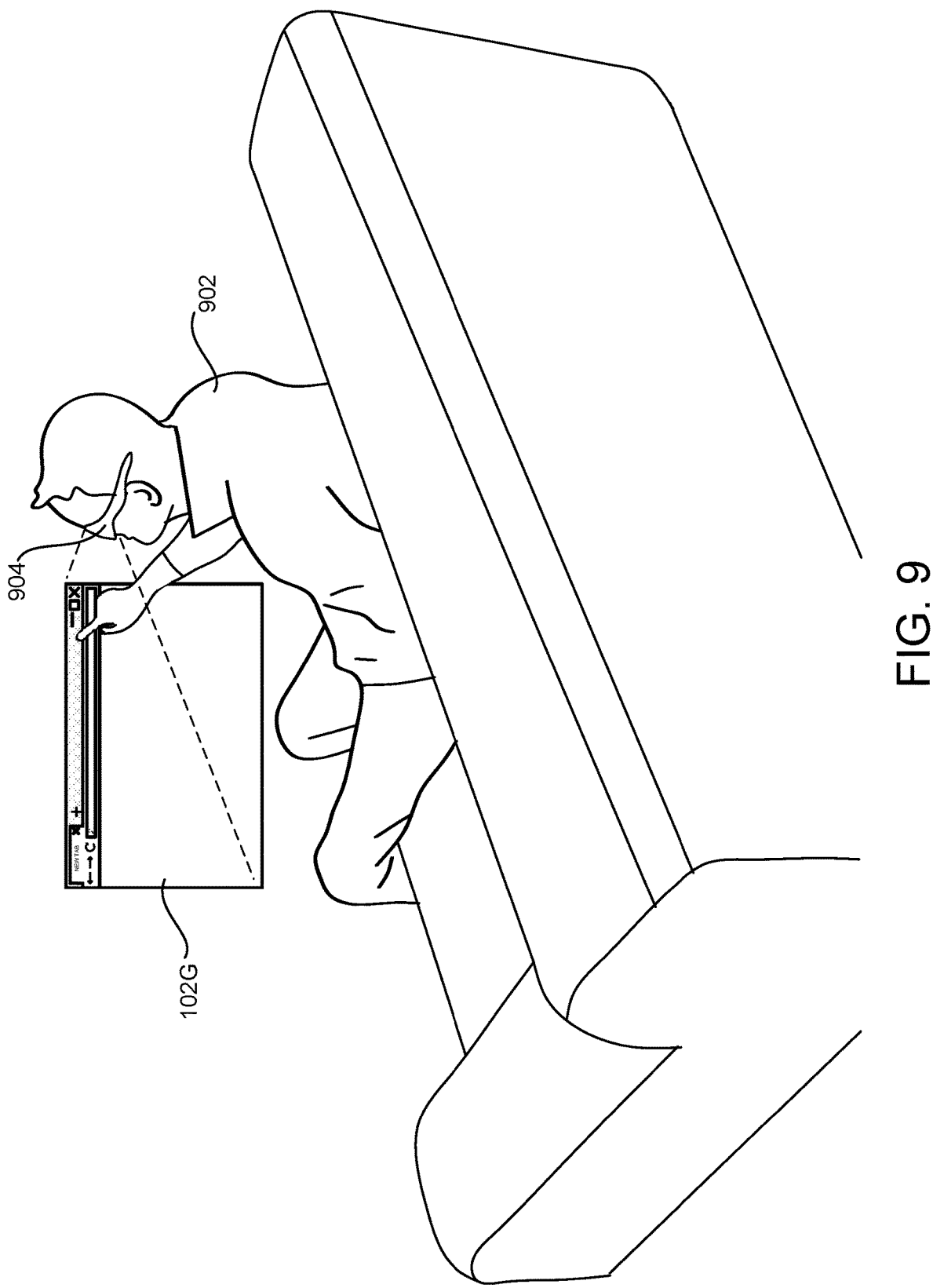
FIG. 9 is a pictorial diagram illustrating aspects of the utilization of the various technologies disclosed herein with an augmented or virtual reality device.

FIG. 9 is a pictorial diagram illustrating aspects of the utilization of the various technologies disclosed herein with AR and VR devices. In particular, FIG. 9 illustrates a user 902 utilizing a head-mounted VR device 904 to interact with a virtual UI window 102G. In order to provide this functionality, the VR device 904 includes one or more display panels (not shown in FIG. 9) that display computer-generated ("CG") graphics, including UI elements such as those described above.

For example, the VR device 904 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user and provide both right-eye and left-eye viewing via right-eye and left-eye viewing regions of the unitary display panel. In each of these implementations, the ability of the VR device 904 to separately display different right-eye and left-eye graphical content via right-eye and left-eye displays might be used to provide a user 902 of the VR device 904 with a stereoscopic viewing experience.

The VR device 904 might include a variety of on-board sensors. For example, and without limitation, a sensor subsystem (not shown in FIG. 9) might include one or more outward facing optical cameras (e.g., cameras located on an external surface of the VR device 904 and forward facing in a viewing direction of the user 902), such as an optical camera. The VR device 904 can also include one or more inward facing optical cameras (also not shown in FIG. 9) (e.g., rearward facing toward the user 902 and/or toward one or both eyes of the user 902).

The VR device 904 can also include a variety of other sensors (not shown in FIG. 9) including, but not limited to, accelerometers, gyroscopes, magnetometers, environment understanding cameras, depth cameras, inward or outward facing video cameras, microphones, ambient light sensors, and potentially other types of sensors. Data obtained by the sensors can be utilized to detect the location, orientation (which might be referred to as a "pose"), and movement of the VR device 904.

The one or more outward facing optical cameras of the VR device 904 can be configured to observe the real-world environment and output images illustrating the real-world environment observed by a user 902 of the VR device 904. The optical cameras are red-green-blue ("RGB") cameras and infrared cameras in one embodiment. It is to be appreciated, however, that other types of cameras can be utilized in other configurations such as, but not limited to, black and white ("B&W") cameras. Additionally, the same or different cameras can be utilized for tracking motion of the head of the user 902 (i.e., "head tracking").

The VR device 904 might also include a processing subsystem (not shown in FIG. 9) that includes one or more processor devices that perform at least some of the processes and operations described herein, as defined by instructions executed by the processing subsystem. Such processes or operations might include generating and providing image signals to the display panels, receiving sensory signals from sensors such as cameras, and enacting control strategies and procedures responsive to those sensory signals. Other computing systems, such as local or remote computing devices might also perform some of the computational tasks disclosed herein.

The VR device 904 might also include an on-board data storage subsystem (not shown in FIG. 9) that includes one or more memory devices storing computer-executable instructions (e.g., software and/or firmware) executable by the processing subsystem and might additionally hold other suitable types of data. The VR device 904 might also include a communications subsystem supporting wired and/or wireless communications with remote devices (i.e., off-board devices) over a communications network (not shown in FIG. 9). As an example, the communication subsystem of the VR device 904 might be configured to wirelessly send or receive data, images, digital audio, and/or other information to and from the remote computing devices.

In order to provide the functionality discussed above with regard to FIGS. 1-8 the VR device 904 can present UI elements, such as the UI window 102G to a user 902. Additionally, the VR device 904 can utilize the sensors described above to detect the position and movement of the fingers and hands of the user 902. Through the use of data describing the position of movement of the fingers of the user 902, the VR device 904 can detect gestures made by the user 902 in three-dimensional space with respect to virtual UI elements presented by the VR device 904, such as the UI window 102G.

Accordingly, in view of this functionality, and as mentioned above, the term "touch" as utilized herein encompasses both the physical touch of a device, such as a device with a physical touchscreen, and the virtual touch of a UI element presented by a VR device 904 or an AR device. In this regard, it is also to be appreciated that the technologies disclosed herein can be utilized with AR devices, which can augment a user's view of the real-world environment with virtual UI elements, such as the UI window 102G. The virtual UI elements appear as if they are actually present in the real-world environment when the real-world environment is viewed with such an AR device. Tracking of a user's hand can be performed in a manner similar to that described above and gestures and associated functionality such as that described above with regard to FIGS. 1-8 can be implemented.

Figure 10:
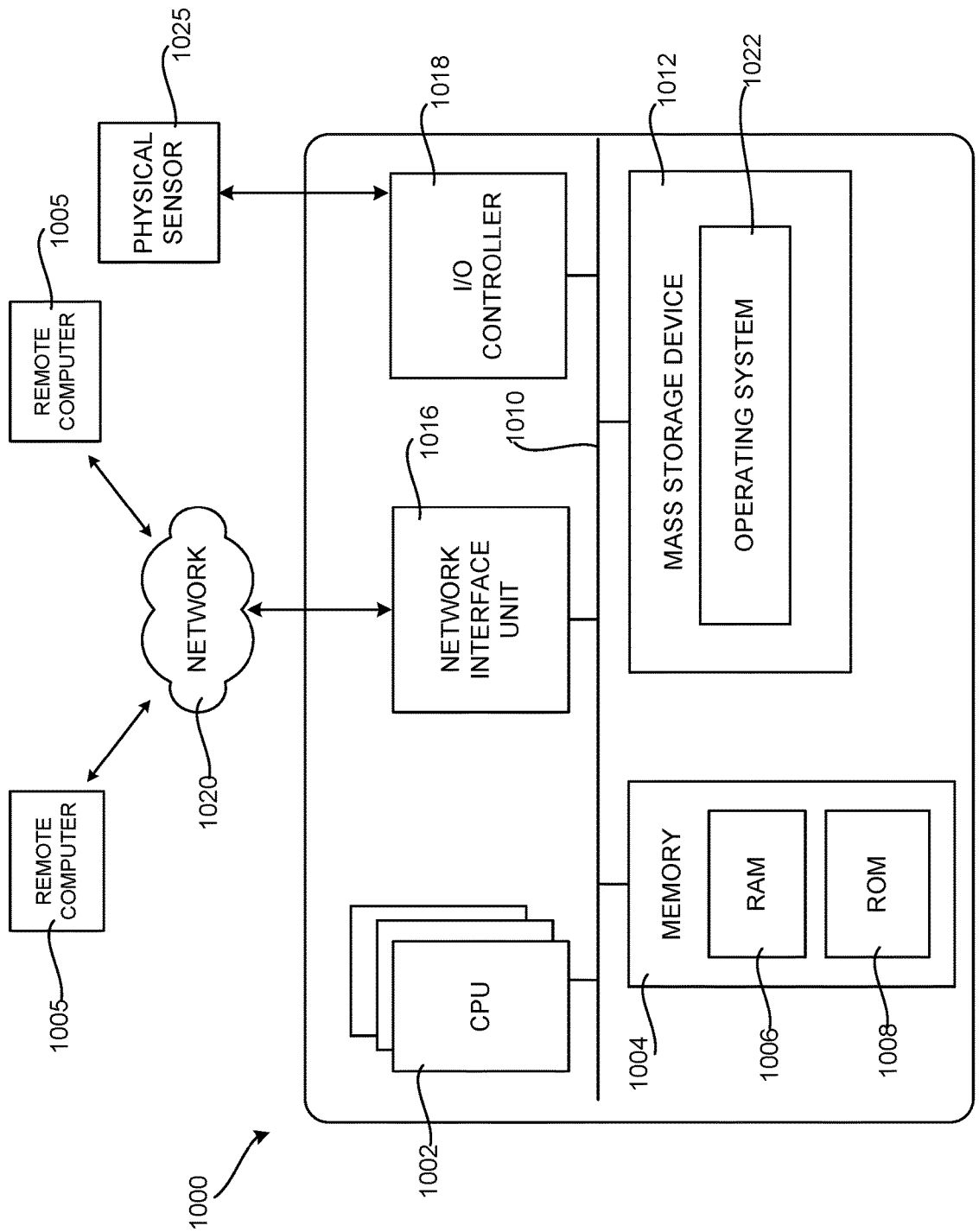
FIG. 10 is a computer architecture diagram showing an illustrative computer hardware and software architecture for a computing device that can implement aspects of the technologies presented herein.

FIG. 10 is a computer architecture diagram showing an illustrative computer hardware and software architecture for a computing device that can implement the various technologies presented herein. In particular, the architecture illustrated in FIG. 10 can be utilized to implement a touch-enabled computing device such as a mobile phone, an e-reader, a smartphone, a desktop computer, a tablet computer, a laptop computer, or another type of computing device configured to receive and process touch-based input.

The computer 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system ("BIOS" or "firmware") containing the basic routines that help to transfer information between elements within the computer 1000, such as during startup, can be stored in the ROM 1008. The computer 1000 further includes a mass storage device 1012 for storing an operating system 1022, application programs, and other types of programs. In one embodiment, the operation system 1022 provides the functionality described above with regard to FIGS. 1A-9. Other modules or program components can provide this functionality in other embodiments. The mass storage device 1012 can also be configured to store other types of programs and data.

The mass storage device 1012 is connected to the CPU 1002 through a mass storage controller (not shown) connected to the bus 1010. The mass storage device 1012 and its associated computer readable media provide non-volatile storage for the computer 1000. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1000. For purposes of the claims, the phrase "computer storage medium," and variations thereof, does not include waves or signals per se or communication media.

According to various configurations, the computer 1000 can operate in a networked environment using logical connections to remote computers through a network such as the network 1020. The computer 1000 can connect to the network 1020 through a network interface unit 1016 connected to the bus 1010. It should be appreciated that the network interface unit 1016 can also be utilized to connect to other types of networks and remote computer systems. The computer 1000 can also include an input/output controller 1018 for receiving and processing input from a number of other devices, including a keyboard, mouse, touch input, an electronic stylus (not shown in FIG. 10), or a physical sensor such as a video camera. Similarly, the input/output controller 1018 can provide output to a display screen or other type of output device (also not shown in FIG. 10).

It should be appreciated that the software components described herein, when loaded into the CPU 1002 and executed, can transform the CPU 1002 and the overall computer 1000 from a general-purpose computing device into a special-purpose computing device customized to facilitate the functionality presented herein. The CPU 1002 can be constructed from any number of transistors or other discrete circuit elements, which can individually or collectively assume any number of states. More specifically, the CPU 1002 can operate as a finite-state machine, in response to executable instructions contained within the software modules disclosed herein. These computer-executable instructions can transform the CPU 1002 by specifying how the CPU 1002 transitions between states, thereby transforming the transistors or other discrete hardware elements constituting the CPU 1002.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1000 in order to store and execute the software components presented herein. It also should be appreciated that the architecture shown in FIG. 10 for the computer 1000, or a similar architecture, can be utilized to implement other types of computing devices, including hand-held computers, video game devices, embedded computer systems, mobile devices such as smartphones, tablets, and AR and VR devices such as that described above with regard to FIG. 9, and other types of computing devices known to those skilled in the art. It is also contemplated that the computer 1000 might not include all of the components shown in FIG. 10, can include other components that are not explicitly shown in FIG. 10, or can utilize an architecture completely different than that shown in FIG. 10.

Figure 11:
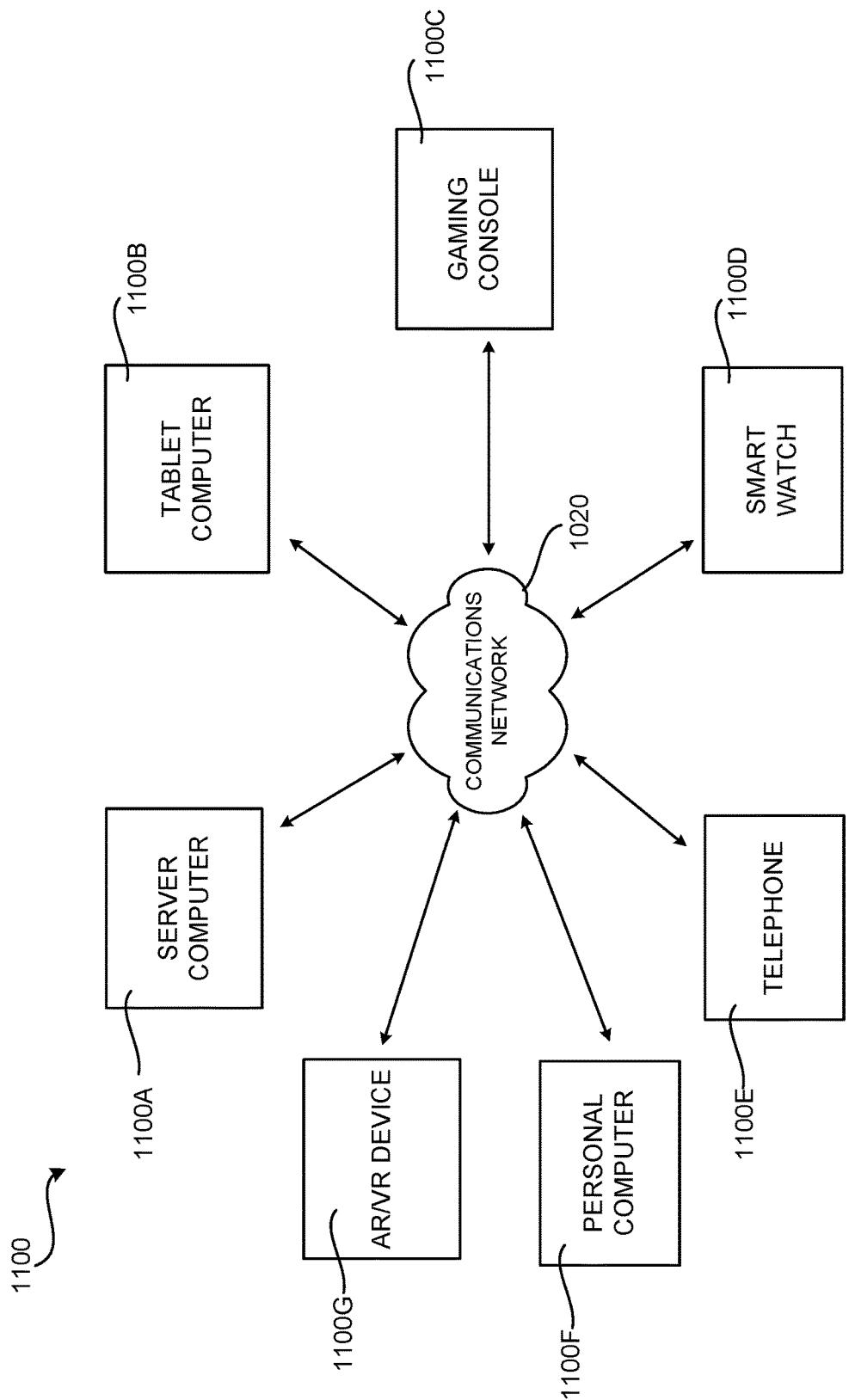
FIG. 11 is a network diagram illustrating a distributed computing environment in which aspects of the disclosed technologies can be implemented.

FIG. 11 is a network diagram illustrating a distributed network computing environment 1100 in which aspects of the disclosed technologies can be implemented, according to various embodiments presented herein. As shown in FIG. 11, one or more server computers 1100A can be interconnected via a communications network 1120 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 1100B, a gaming console 1100C, a smart watch 1100D, a telephone 1100E, such as a smartphone, a personal computer 1100F, and an AR/VR device 1100G.

In a network environment in which the communications network 1020 is the Internet, for example, the server computer 1100A can be a dedicated server computer operable to process and communicate data to and from the client computing devices 1100B-1100G via any of a number of known protocols, such as, hypertext transfer protocol ("HTTP"), file transfer protocol ("FTP"), or simple object access protocol ("SOAP"). Additionally, the networked computing environment 1100 can utilize various data security protocols such as secured socket layer ("SSL") or pretty good privacy ("PGP"). Each of the client computing devices 1100B-1100G can be equipped with an operating system operable to support one or more computing applications or terminal sessions such as a web browser (not shown in FIG. 11), or other graphical user interface, including those illustrated above, or a mobile desktop environment (not shown in FIG. 11) to gain access to the server computer 1100A.

The server computer 1100A can be communicatively coupled to other computing environments (not shown in FIG. 11) and receive data regarding a participating user's interactions/resource network. In an illustrative operation, a user (not shown in FIG. 11) may interact with a computing application running on a client computing device 1100B-1100G to obtain desired data and/or perform other computing applications.

The data and/or computing applications may be stored on the server 1100A, or servers 1100A, and communicated to cooperating users through the client computing devices 1100B-1100G over an exemplary communications network 1120. A participating user (not shown in FIG. 11) may request access to specific data and applications housed in whole or in part on the server computer 1100A. These data may be communicated between the client computing devices 1100B-1100G and the server computer 1100A for processing and storage.

The server computer 1100A can host computing applications, processes and applets for the generation, authentication, encryption, and communication of data and applications, and may cooperate with other server computing environments (not shown in FIG. 11), third party service providers (not shown in FIG. 11), network attached storage ("NAS") and storage area networks ("SAN") to realize application/data transactions.

It should be appreciated that the computing architecture shown in FIG. 11 and the distributed network computing environment shown in FIG. 11 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method for providing visual feedback during a touch-based operation on a user interface (UI) element, the method comprising: displaying a UI element on a touch-sensitive display of a touch-enabled computing device; receiving a first user input gesture by way of the touch-sensitive display; responsive to receiving the first user input gesture, modifying a size of the UI element from an original size to a reduced size and displaying the UI element at the reduced size; receiving a second user input gesture by way of the touch-sensitive display; performing an operation on the UI element in response to the second user input gesture; and following the performance of the operation on the UI element, modifying the size of the UI element from the reduced size to the original size and displaying the UI element at the original size.

Clause 2. The computer-implemented method of clause 1, wherein the first user input gesture comprises a three-finger tap and hold gesture.

Clause 3. The computer-implemented method of any of clauses 1 or 2, wherein the second user input gesture comprises a three-finger drag gesture.

Clause 4. The computer-implemented method of any of clauses 1-3, wherein the first user input gesture comprises a one-finger tap and hold gesture in an area of the UI element designated for performing a move operation on the UI element.

Clause 5. The computer-implemented method of any of clauses 1-4, further comprising responsive to receiving the first user input gesture: displaying a visual indicator surrounding the UI element, the visual indicator having a size equivalent to the original size of the UI element.

Clause 6. The computer-implemented method of any of clauses 1-5, wherein the second user input gesture comprises a one finger drag gesture, wherein the operation performed on the UI element in response to the second user input gesture comprises the move operation, and wherein the visual indicator is moved with the UI element.

Clause 7. The computer-implemented method of any of clauses 1-6, wherein the display of the visual indicator is removed following the move operation.

Clause 8. The computer-implemented method of any of clauses 1-7, wherein the visual indicator is translucent.

Clause 9. A computer-readable storage medium having computer-executable instructions stored thereupon which, when executed by a touch-enabled computing device, cause the touch-enabled computing device to: display a UI element on a touch-sensitive display of the touch-enabled computing device; receive a first user input gesture by way of the touch-sensitive display, the first user input gesture comprising a tap and hold gesture located at an edge of the UI element; and responsive to receiving the first user input gesture, display a visual indicator along the edge of the UI element.

Clause 10. The computer-readable storage medium of clause 9, wherein the computer-readable storage medium has further computer-executable instructions stored thereupon to: receive a second user input gesture by way of the touch-sensitive display, the second user input gesture comprising a one finger drag gesture; and responsive to receiving the second user input gesture, resizing the UI element in a direction of the second user input gesture, wherein the visual indicator is displayed along the edge of the UI element during resizing of the UI element.

Clause 11. The computer-readable storage medium of any of clauses 9 or 10, wherein the computer-readable storage medium has further computer-executable instructions stored thereupon to remove the display of the visual indicator following completion of the second user input gesture.

Clause 12. The computer-readable storage medium of any of clauses 9-11, wherein the computer-readable storage medium has further computer-executable instructions stored thereupon to reduce a size of the visual indicator during resizing of the UI element.

Clause 13. The computer-readable storage medium of any of clauses 9-12, wherein the UI element comprises a UI window having a left edge, a right edge, a bottom edge, and a top edge, and wherein the first user input gesture is made at the left edge, the right edge, the bottom edge, or the top edge of the UI window.

Clause 14. The computer-readable storage medium of any of clauses 9-13, wherein the visual indicator is translucent.

Clause 15. A touch-enabled computing device, comprising: at least one processor; a touch-sensitive display; and a computer-readable storage medium having computer-executable instructions stored thereupon which, when executed by the at least one processor, cause the touch-enabled computing device to: display a UI element on the touch-sensitive display; receive a first user input gesture by way of the touch-sensitive display, the first user input gesture comprising a tap and hold gesture located at a corner of the UI element, the corner of the UI element comprising an intersection of a first edge and a second edge of the UI element; and responsive to receiving the first user input gesture, displaying visual indicators along the first edge of the UI element and along the second edge of the UI element.

Clause 16. The computing device of clause 15, wherein the computer-readable storage medium has further computer-executable instructions stored thereupon to: receive a second user input gesture by way of the touch-sensitive display, the second user input gesture comprising a one finger drag gesture; and responsive to receiving the second user input gesture, resizing the UI element in a direction of the second user input gesture.

Clause 17. The computing device of any of clauses 15 or 16, wherein the visual indicators are displayed along the first edge of the UI element and the second edge of the UI element during resizing of the UI element.

Clause 18. The computing device of any of clauses 15-17, wherein the computer-readable storage medium has further computer-executable instructions stored thereupon to remove the display of the visual indicators following completion of the second user input gesture.

Clause 19. The computing device of any of clauses 15-18, wherein the computer-readable storage medium has further computer-executable instructions stored thereupon to reduce a size of the visual indicators during resizing of the UI element.

Clause 20. The computing device of any of clauses 15-19, wherein the visual indicators are translucent.

Based on the foregoing, it should be appreciated that technologies for providing visual feedback during touch-based operations on UI elements have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for providing visual feedback during a touch-based operation on a user interface (GUI) element, the method comprising:
   displaying a UI element on a touch-sensitive display of a touch-enabled computing device;
   receiving a first user input gesture by way of the touch-sensitive display;
   responsive to receiving the first user input gesture, modifying a size of the UI element from an original size to a reduced size, displaying the UI element at the reduced size, and displaying a visual indicator surrounding the UI element, wherein the visual indicator has a size equivalent to the original size of the UI element;
   receiving a second user input gesture by way of the touch-sensitive display;
   performing an operation on the UI element in response to the second user input gesture, wherein the operation performed on the UI element in response to the second user input gesture comprises a move operation, and wherein the visual indicator is moved with the UI element; and
   following the performance of the operation on the UI element, modifying the size of the UI element from the reduced size to the original size and displaying the UI element at the original size.

2. The computer-implemented method of claim 1, wherein the first user input gesture comprises a three-finger tap and hold gesture.

3. The computer-implemented method of claim 2, wherein the second user input gesture comprises a three-finger drag gesture.

4. The computer-implemented method of claim 1, wherein the first user input gesture comprises a one-finger tap and hold gesture in an area of the UI element designated for performing a move operation on the UI element.

5. The computer-implemented method of claim 1, wherein the second user input gesture comprising a one finger drag gesture.

6. The computer-implemented method of claim 1, wherein the display of the visual indicator is removed following the move operation.

7. The computer-implemented method of claim 1, wherein the visual indicator is translucent.

8. The computer-readable storage medium having computer-executable instructions stored thereupon which, when executed by a touch-enabled computing device, cause the touch-enabled computing device to:
   display a UI element on a touch-sensitive display of a touch-enabled computing device;
   receive a first user input gesture by way of the touch-sensitive display;
   responsive to receiving the first user input gesture, modify a size of the UI element from an original size to a reduced size, display the UI element at the reduced size, and display a visual indicator surrounding the UI element, wherein the visual indicator has a size equivalent to the original size of the UI element;
   receive a second user input gesture by way of the touch-sensitive display;
   perform an operation on the UI element in response to the second user input gesture, wherein the operation performed on the UI element in response to the second user input gesture comprises a move operation, and wherein the visual indicator is moved with the UI element; and
   following the performance of the operation on the UI element, modify the size of the UI element from the reduced size to the original size and displaying the UI element at the original size.

9. The computer-readable storage medium of claim 8, wherein the first user input gesture comprises a three-finger tap and hold gesture and wherein the second user input gesture comprises a three-finger drag gesture.

10. The computer-readable storage medium of claim 8, wherein the first user input gesture comprises a one-finger tap and hold gesture in an area of the UI element designated for performing a move operation on the UI element.

11. The computer-readable storage medium of claim 8, wherein the second user input gesture comprises a one finger drag gesture, and wherein the display of the visual indicator is removed following the move operation.

12. The computer-readable storage medium of claim 8, wherein the visual indicator is translucent.

13. A touch-enabled computing device, comprising:
   at least one processor;
   a touch-sensitive display; and
   a computer-readable storage medium having computer-executable instructions stored thereupon which, when executed by the at least one processor, cause the touch-enabled computing device to:
      display a UI element on a touch-sensitive display of the touch-enabled computing device;
      receive a first user input gesture by way of the touch-sensitive display;
      responsive to receiving the first user input gesture, modify a size of the UI element from an original size to a reduced size, display the UI element at the reduced size, and display a visual indicator surrounding the UI element, wherein the visual indicator has a size equivalent to the original size of the UI element;
      receive a second user input gesture by way of the touch-sensitive display;
      perform an operation on the UI element in response to the second user input gesture, wherein the operation performed on the UI element in response to the second user input gesture comprises a move operation, and wherein the visual indicator is moved with the UI element; and
      following the performance of the operation on the UI element, modify the size of the UI element from the reduced size to the original size and displaying the UI element at the original size.

14. The touch-enabled computing device of claim 13, wherein the first user input gesture comprises a three-finger tap and hold gesture and wherein the second user input gesture comprises a three-finger drag gesture.

15. The touch-enabled computing device of claim 13, wherein the first user input gesture comprises a one-finger tap and hold gesture in an area of the UI element designated for performing a move operation on the UI element.

16. The touch-enabled computing device of claim 13, wherein the second user input gesture comprises a one finger drag gesture, and wherein the display of the visual indicator is removed following the move operation.

17. The touch-enabled computing device of claim 13, wherein the visual indicator is translucent.

* * * * *